United States Patent
Chandrasekhar et al.

(10) Patent No.: US 11,496,353 B2
(45) Date of Patent: Nov. 8, 2022

(54) ROOT CAUSE ANALYSIS AND AUTOMATION USING MACHINE LEARNING

(71) Applicant: Samsung Electronics Co., Ltd, Suwon-si (KR)

(72) Inventors: Vikram Chandrasekhar, Mountain View, CA (US); Yongseok Park, Suwon-si (KR); Shan Jin, College Station, TX (US); Pranav Madadi, Mountain View, CA (US); Eric Johnson, Santa Clara, CA (US); Jianzhong Zhang, Plano, TX (US); Russell Ford, San Jose, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 143 days.

(21) Appl. No.: 15/929,951

(22) Filed: May 29, 2020

(65) Prior Publication Data
US 2020/0382361 A1 Dec. 3, 2020

Related U.S. Application Data

(60) Provisional application No. 62/854,536, filed on May 30, 2019, provisional application No. 62/884,357, (Continued)

(51) Int. Cl.
*H04L 41/0631* (2022.01)
*H04L 41/16* (2022.01)
(Continued)

(52) U.S. Cl.
CPC .......... *H04L 41/0636* (2013.01); *G06N 5/04* (2013.01); *G06N 20/00* (2019.01); *H04L 41/16* (2013.01)

(58) Field of Classification Search
CPC ..... H04L 41/0636; H04L 41/16; G06N 20/00; G06N 5/04
See application file for complete search history.

(56) References Cited

U.S. PATENT DOCUMENTS

2016/0241429 A1 8/2016 Froehlich
2017/0094537 A1 3/2017 Yang et al.
(Continued)

FOREIGN PATENT DOCUMENTS

WO 2014040633 A1 3/2014
WO 2015148328 A1 10/2015
(Continued)

OTHER PUBLICATIONS

Extended European Search Report dated Mar. 3, 2022 regarding Application No. 20814909.6, 9 pages.
(Continued)

*Primary Examiner* — Duc C Ho

(57) ABSTRACT

A method for discovering and diagnosing network anomalies. The method includes receiving key performance indicator (KPI) data and alarm data. The method includes extracting features based on samples obtained by discretizing the KPI data and the alarm data. The method includes generating a set of rules based on the features. The method includes identifying a sample as a normal sample or an anomaly sample. In response to identifying the sample as the anomaly sample, the method includes identifying a first rule that corresponds to the sample, wherein the first rule indicates symptoms and root causes of an anomaly included in the sample. The method further includes applying the root causes to derive a root cause explanation of the anomaly and performing a corrective action to resolve the anomaly based on the first rule.

20 Claims, 19 Drawing Sheets

Related U.S. Application Data filed on Aug. 8, 2019, provisional application No. 62/887,084, filed on Aug. 15, 2019, provisional application No. 62/890,670, filed on Aug. 23, 2019, provisional application No. 62/892,650, filed on Aug. 28, 2019, provisional application No. 62/894,110, filed on Aug. 30, 2019, provisional application No. 62/894,342, filed on Aug. 30, 2019, provisional application No. 62/898,490, filed on Sep. 10, 2019, provisional application No. 62/900,862, filed on Sep. 16, 2019, provisional application No. 62/915,820, filed on Oct. 16, 2019, provisional application No. 62/981,074, filed on Feb. 25, 2020.

(51) Int. Cl.
 *G06N 5/04* (2006.01)
 *G06N 20/00* (2019.01)

(56) References Cited

U.S. PATENT DOCUMENTS

| | | | |
|---|---|---|---|
| 2017/0310542 A1 | 10/2017 | Nair et al. | |
| 2017/0310546 A1* | 10/2017 | Nair | H04L 41/0654 |
| 2019/0068619 A1* | 2/2019 | Fan | H04L 41/064 |
| 2019/0129395 A1* | 5/2019 | Niemiec | G05B 23/0235 |
| 2019/0356533 A1 | 11/2019 | Vasseur et al. | |
| 2020/0084087 A1* | 3/2020 | Sharma | H04W 24/04 |
| 2020/0092159 A1* | 3/2020 | Thampy | H04L 41/145 |
| 2020/0267063 A1 | 8/2020 | Ye et al. | |

FOREIGN PATENT DOCUMENTS

| | | |
|---|---|---|
| WO | 2017050113 A1 | 3/2017 |
| WO | 2017118380 A1 | 7/2017 |
| WO | 2019091359 A1 | 5/2019 |
| WO | 2020/044352 A1 | 3/2020 |

OTHER PUBLICATIONS

Yang et al., "Deep Network Analyzer (DNA): A Big Data Analytics Platform for Cellular Networks", IEEE Internet of Things Journal, vol. 4, No. 6, Dec. 2017, pp. 2019-2027.

Szilagyi et al., "An Automatic Detection and Diagnosis Framework for Mobile Communication Systems", IEEE Transactions on Network and Service Management, vol. 9, No. 2, Jun. 2012, pp. 184-197.

International Preliminary Report on Patentability dated Nov. 30, 2021 regarding Interntional Application No. PCT/KR2020/007087, 5 pages.

* cited by examiner

ROOT CAUSE ANALYSIS AND AUTOMATION USING MACHINE LEARNING

CROSS-REFERENCE TO RELATED APPLICATION AND CLAIM OF PRIORITY

This application claims priority under 35 U.S.C. § 119(e) to:
(i) U.S. Provisional Patent Application No. 62/854,536 filed on May 30, 2019,
(ii) U.S. Provisional Patent Application No. 62/884,357 filed on Aug. 8, 2019,
(iii) U.S. Provisional Patent Application No. 62/887,084 filed on Aug. 15, 2019,
(iv) U.S. Provisional Patent Application No. 62/890,670 filed on Aug. 23, 2019,
(v) U.S. Provisional Patent Application No. 62/892,650 filed on Aug. 28, 2019,
(vi) U.S. Provisional Patent Application No. 62/894,110 filed on Aug. 30, 2019,
(vii) U.S. Provisional Patent Application No. 62/894,342 filed on Aug. 30, 2019,
(viii) U.S. Provisional Patent Application No. 62/898,490 filed on Sep. 10, 2019,
(ix) U.S. Provisional Patent Application No. 62/900,862 filed on Sep. 16, 2019,
(x) U.S. Provisional Patent Application No. 62/915,820 filed on Oct. 16, 2019, and
(xi) U.S. Provisional Patent Application No. 62/981,074 filed on Feb. 25, 2020.
The above-identified provisional patent applications are hereby incorporated by reference in its entirety.

TECHNICAL FIELD

This disclosure relates generally to machine learning based root cause analysis of a anomalies in a cellular network. More specifically, this disclosure relates to discovering, diagnosing, and recovering from network anomalies.

BACKGROUND

Recently, the number of subscribers to wireless communication services, such as a cellular network, exceeded five billion and continues to grow quickly. The demand of wireless data traffic is rapidly increasing due to the growing popularity among consumers and businesses of smart phones and other mobile data devices, such as tablets, "note pad" computers, net books, eBook readers, and machine type of devices.

The explosive demand for mobile data traffic imposes significant operational challenges for mobile network operators, given their constrained bandwidth and infrastructure. Any change in the network conditions such as higher radio frequency interference negatively affects user experience, such as increased stalling while streaming media content. Therefore, to increase user experience, service providers must rapidly discover the anomalies, uncover the underlying root causes of the anomalies, and apply remedial action. Cellular networks generally incur significant time and human effort for detecting and fixing network anomalies. This inevitably creates prolonged network outages and diminished quality of experience at the end user.

SUMMARY

This disclosure provides root cause analysis and automation using machine learning.

In one embodiment, an apparatus for discovering and diagnosing network anomalies is provided. The apparatus includes a communication interface and a processor. The communication interface is configured to receive key performance indicator (KPI) data and alarm data. The processor is configured to extract features based on samples obtained by discretizing the KPI data and the alarm data. The processor is configured to generate a set of rules based on the features, wherein a portion of the samples that satisfy the rules correspond to anomalies. The processor is configured to identify a sample from the samples as a normal sample or an anomaly sample based on the KPI data and the alarm data. In response to identifying the sample as the anomaly sample, the processor is configured to identify a first rule that corresponds to the sample, wherein the first rule indicates symptoms and root causes of an anomaly included in the sample. The processor is configured to identify apply the root causes to derive a root cause explanation of the anomaly based on KPIs that are linked to the symptoms and root causes of the anomaly. The processor is configured to perform a corrective action to resolve the anomaly based on the first rule.

In another embodiment, a method is provided. The method includes receiving KPI data and alarm data. The method includes extracting features based on samples obtained by discretizing the KPI data and the alarm data. The method includes generating a set of rules based on the features, wherein a portion of the samples that satisfy the rules correspond to anomalies. The method includes identifying a sample as a normal sample or an anomaly sample. In response to identifying the sample as the anomaly sample, the method includes identifying a first rule that corresponds to the sample. The first rule indicates symptoms and root causes of an anomaly included in the sample. The method includes applying the root causes to derive a root cause explanation of the anomaly based on KPIs that are linked to the symptoms and root causes of the anomaly. The method includes performing a corrective action to resolve the anomaly based on the first rule.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system.

Data traffic has increased since deployment of 4G communication systems. To meet the demand for wireless data traffic, efforts have been made to develop an improved 5G or pre-5G communication system. Therefore, the 5G or pre-5G communication system is also called a 'Beyond 4G Network' or a 'Post LTE System.'

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques can be used in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

Figure 1:
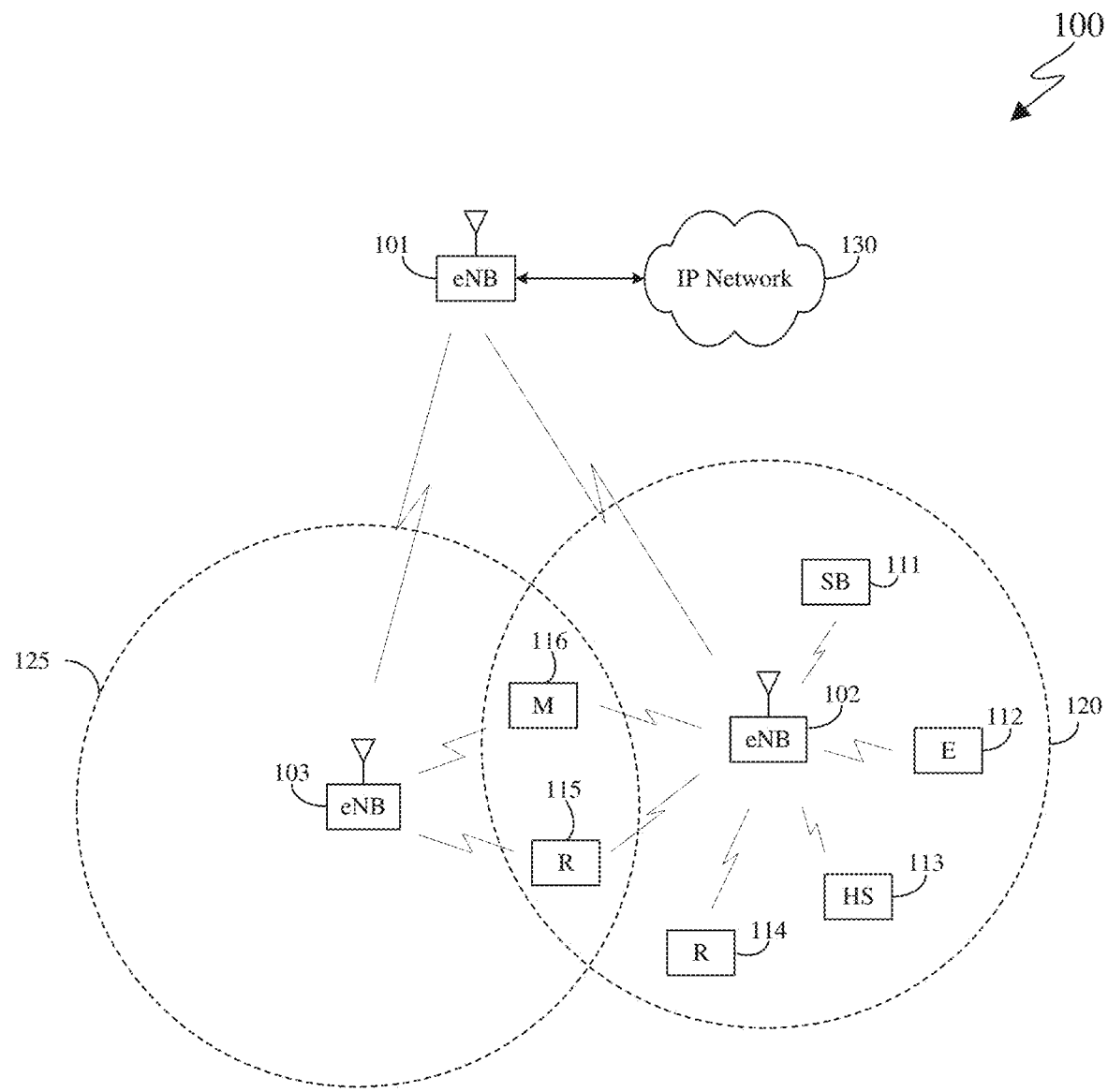
FIG. 1 illustrates an example computing system according to various embodiments of the present disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

The wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network. In certain embodiments, the wireless network 100 includes a server that maintains the eNBs.

Depending on the network type, the term "base station" or "BS" can refer to any component (or collection of components) configured to provide wireless access to a network, such as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The eNB 102 provides wireless broadband access to the network 130 for a first plurality of user equipment's (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, a server, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and manmade obstructions.

As described in more detail below, cellular networks use significant time and human effort for detecting and fixing various network anomalies. As such, human intervention can cause prolonged network outages and diminished quality of experience for an end user. Embodiments of the present disclosure provide analytics for efficiently and accurately automating the discovery and diagnosis of network anomalies. For example, embodiments of this disclosure describe a process of discovering network anomalies and uncovering the root causes of the anomaly using machine learning.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks. Additionally, the eNB 101-103 can transmit data, such as alarms and key performance indicators, indicating the status of the network to a server. The server can detect and diagnose problems in the network as well as provide instructions as to what corrective actions to perform based on the detected and diagnosed problem.

Figure 2A:
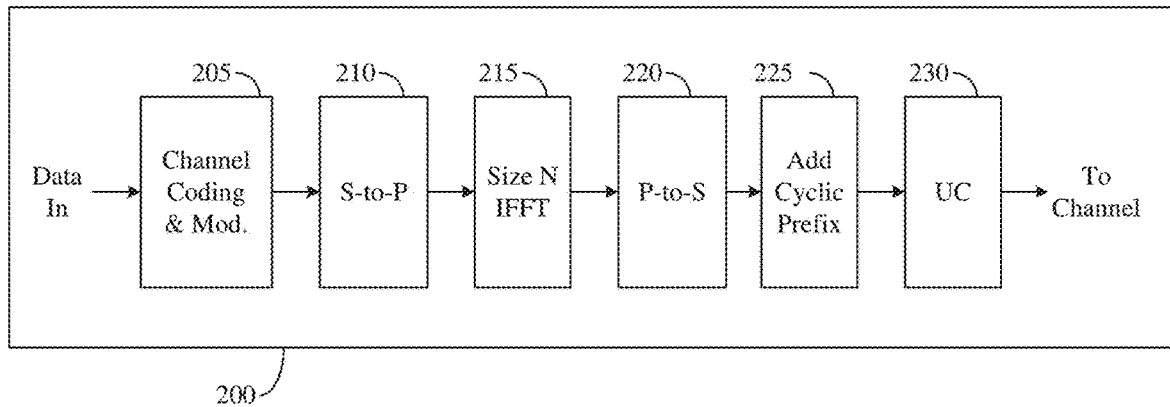
FIGS. 2A-2B and 3A-3B illustrate example devices in a computing system according to various embodiments of the present disclosure.
Figure 2B:
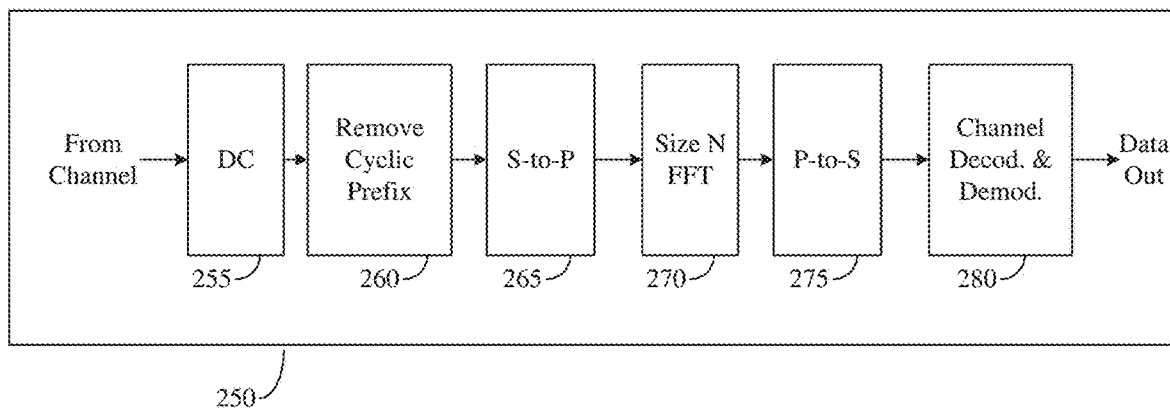

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3A:
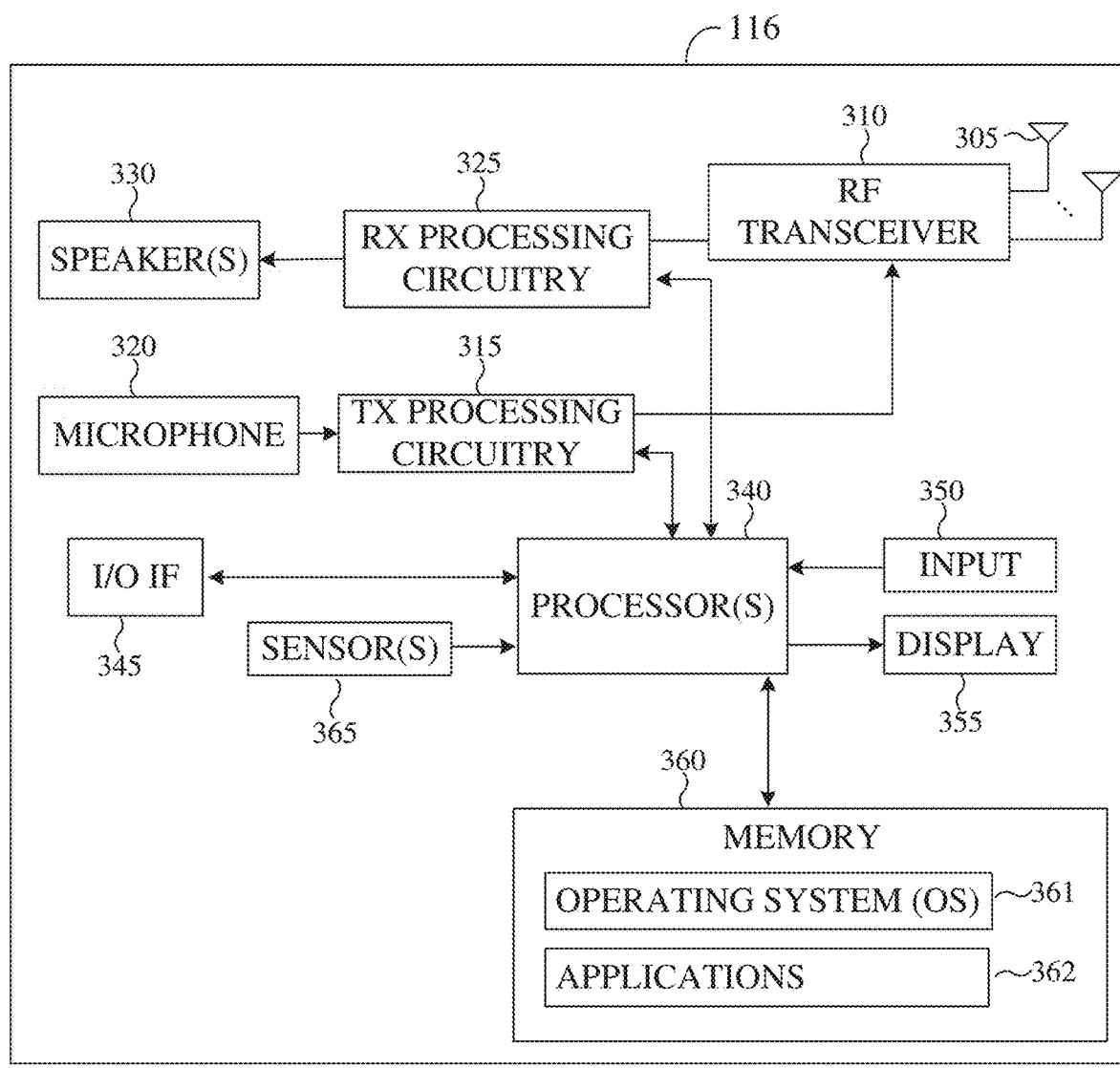

FIG. 3A illustrates an example UE 116 according to this disclosure. The embodiment of the UE 116 illustrated in FIG. 3A is for illustration only, and the UEs 111-115 of FIG. 1 could have the same or similar configuration. However, UEs come in a wide variety of configurations, and FIG. 3A does not limit the scope of this disclosure to any particular implementation of a UE.

In certain embodiments, the UE 116 receives alarm data and key performance indicator data from the eNBs 101-103 in order to detect network anomalies, diagnose the anomalies and provide instructions to correct the detected anomalies. In certain embodiments, detecting network anomalies, diagnosing the anomalies, and providing instructions to correct the detected anomalies, can be performed fully or partially automatically.

The UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, an input 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for root cause analysis and automation using machine learning as described in embodiments of the present disclosure. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the input 350 and the display 355. The operator of the UE 116 can use a keypad such as the input 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM). Although FIG. 3A illustrates one example of UE 116, various changes may be made to FIG. 3A. For example, various components in FIG. 3A could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3A illustrates the UE 116 configured as a mobile telephone or smartphone, UEs could be configured to operate as other types of mobile or stationary devices.

Figure 3B:
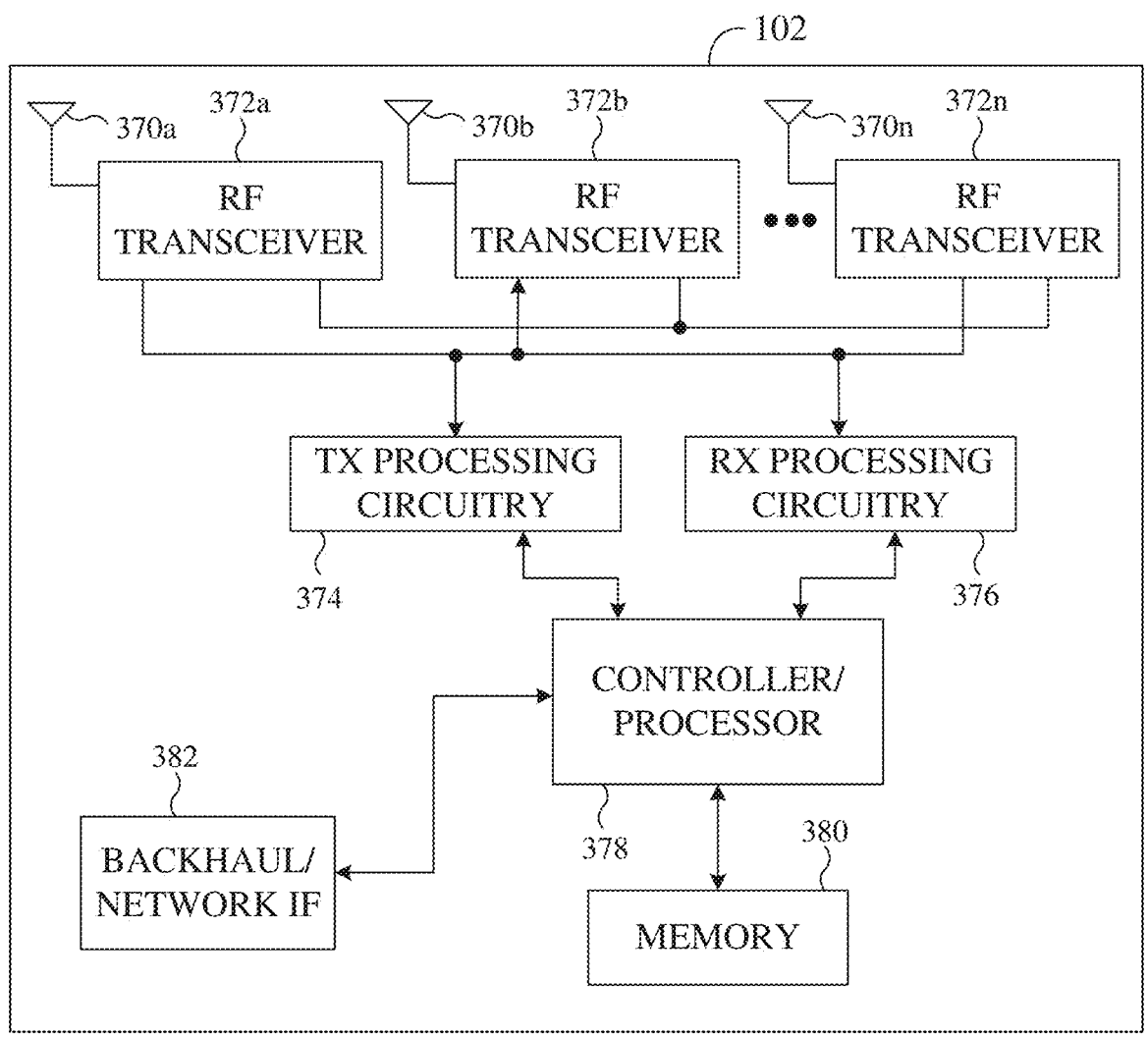

FIG. 3B illustrates an example eNB 102 according to this disclosure. The embodiment of the eNB 102 shown in FIG. 3B is for illustration only, and other eNBs of FIG. 1 could have the same or similar configuration. However, eNBs come in a wide variety of configurations, and FIG. 3B does not limit the scope of this disclosure to any particular implementation of an eNB. It is noted that eNB 101 and eNB 103 can include the same or similar structure as eNB 102.

As shown in FIG. 3B, the eNB 102 includes multiple antennas 370a-370n, multiple RF transceivers 372a-372n, transmit (TX) processing circuitry 374, and receive (RX) processing circuitry 376. In certain embodiments, one or more of the multiple antennas 370a-370n include 2D antenna arrays. The eNB 102 also includes a controller/processor 378, a memory 380, and a backhaul or network interface 382.

The RF transceivers 372a-372n receive, from the antennas 370a-370n, incoming RF signals, such as signals transmitted by UEs or other eNBs. The RF transceivers 372a-372n down-convert the incoming RF signals to generate IF or baseband signals. The IF or baseband signals are sent to the RX processing circuitry 376, which generates processed baseband signals by filtering, decoding, and/or digitizing the baseband or IF signals. The RX processing circuitry 376 transmits the processed baseband signals to the controller/processor 378 for further processing.

The TX processing circuitry 374 receives analog or digital data (such as voice data, web data, e-mail, or interactive video game data) from the controller/processor 378. The TX processing circuitry 374 encodes, multiplexes, and/or digitizes the outgoing baseband data to generate processed baseband or IF signals. The RF transceivers 372a-372n receive the outgoing processed baseband or IF signals from the TX processing circuitry 374 and up-converts the baseband or IF signals to RF signals that are transmitted via the antennas 370a-370n.

The controller/processor 378 can include one or more processors or other processing devices that control the overall operation of the eNB 102. For example, the controller/processor 378 could control the reception of forward channel signals and the transmission of reverse channel signals by the RF transceivers 372a-372n, the RX processing circuitry 376, and the TX processing circuitry 374 in accordance with well-known principles. The controller/processor 378 could support additional functions as well, such as more advanced wireless communication functions. For instance, the controller/processor 378 can perform the blind interference sensing (BIS) process, such as performed by a BIS algorithm, and decodes the received signal subtracted by the interfering signals. Any of a wide variety of other functions could be supported in the eNB 102 by the controller/processor 378. In some embodiments, the controller/processor 378 includes at least one microprocessor or microcontroller.

The controller/processor 378 is also capable of executing programs and other processes resident in the memory 380, such as a basic OS. The controller/processor 378 is also capable of supporting root cause analysis and automation using machine learning as described in embodiments of the present disclosure. In some embodiments, the controller/processor 378 supports communications between entities, such as web RTC. The controller/processor 378 can move data into or out of the memory 380 as required by an executing process. The memory 380 stores various artificial intelligence (A) algorithms for estimating a UE speed and a training dataset to train the various AI algorithms.

The controller/processor 378 is also coupled to the backhaul or network interface 382. The backhaul or network interface 382 allows the eNB 102 to communicate with other devices or systems over a backhaul connection or over a network. The backhaul or network interface 382 could support communications over any suitable wired or wireless connection(s). For example, when the eNB 102 is implemented as part of a cellular communication system (such as one supporting 5G, LTE, or LTE-A), the backhaul or network interface 382 could allow the eNB 102 to communicate with other eNBs over a wired or wireless backhaul connection. When the eNB 102 is implemented as an access point, the backhaul or network interface 382 could allow the eNB 102 to communicate over a wired or wireless local area network or over a wired or wireless connection to a larger network (such as the Internet). The backhaul or network interface 382 includes any suitable structure supporting communications over a wired or wireless connection, such as an Ethernet or RF transceiver.

In certain embodiments, eNB 102 transmits alarm data and key performance indicator data. via the backhaul or network interface 382, to a server in order to detect network anomalies, diagnose the anomalies and provide instructions to correct the detected anomalies. In certain embodiments, detecting network anomalies, diagnosing the anomalies, and providing instructions to correct the detected anomalies, can be performed fully or partially automatically.

Although FIG. 3B illustrates one example of an eNB 102, various changes may be made to FIG. 3B. For example, the eNB 102 could include any number of each component shown in FIG. 3B. As a particular example, an access point could include a number of interfaces 382, and the controller/processor 378 could support routing functions to route data between different network addresses. As another particular example, while shown as including a single instance of TX processing circuitry 374 and a single instance of RX processing circuitry 376, the eNB 102 could include multiple instances of each (such as one per RF transceiver).

In certain embodiments, of the present disclosure, BSs provides various data sources designated as Key Performance Indicators (KPIs) to an Operations Support System (OSS). The OSS could be part of a server that is associated with the backhaul or network interface 382 of FIG. 3B. KPIs can be sent periodically, such as every fifteen minutes or another present time interval. KPIs can include Performance Management (PM) counters. The PM data reflect the state and behavior of the system. For the sake of convenience, the terms "KPI data" and "PM data" are used interchangeably in this patent document to refer to information that is sent periodically from the eNBs. A subset of these data, referred to as Key Quality Indicators (KQIs). A KQI provides aggregated metrics reflecting the level of service accessibility, service retainability, service availability, service quality and service mobility. Besides PM data, the BSs also report Fault Management (FM) data or alarms, that are triggered in response to one or more unexpected events at the BS, such as CPU overload, Memory Overload, DSP Restart, MME-Failure, and the like. For the sake of convenience, the terms "FM data" and "alarm data" are used interchangeably in this patent document to refer to information that is sent indicating an alarm.

Troubleshooting is triggered in response to detecting one or more of the KQIs falling outside a threshold or a nominal value. The troubleshooting process involves a manual or automated reasoning step for inferring the root-cause explanation to the KQI degradation. The root causes are obtained by detecting and diagnosing KPI anomalies providing fine-grained causal information for the KQI anomaly. Other sources such as call subscriber traces, trouble tickets, and customer complaint information may be included during this process.

For example, when a service quality KQI indicates an anomaly of degradation in IP throughput, the possible root causes could be either low traffic demand or high radio frequency interference. Once root cause analysis (RCA) of the anomaly is complete, a recovery step could range from simply resetting the BS, or changing the Operations and Maintenance (OAM) parameters (e.g. transmit power, electrical tilt) at the BS.

Manual troubleshooting requires human domain experts engaging in each RCA step including problem detection, diagnosis, and problem recovery. Since each BS reports thousands of KPIs during a single reporting interval (which can occur every fifteen minutes or another preset interval), which occurs regularly at various present time intervals, processing the large quantities of data is non-trivial for a human expert. Additional costs are incurred for reproducing the problem (via drive tests), testing different solutions, and verifying the final solution fixes the underlying issue.

Figure 4A:
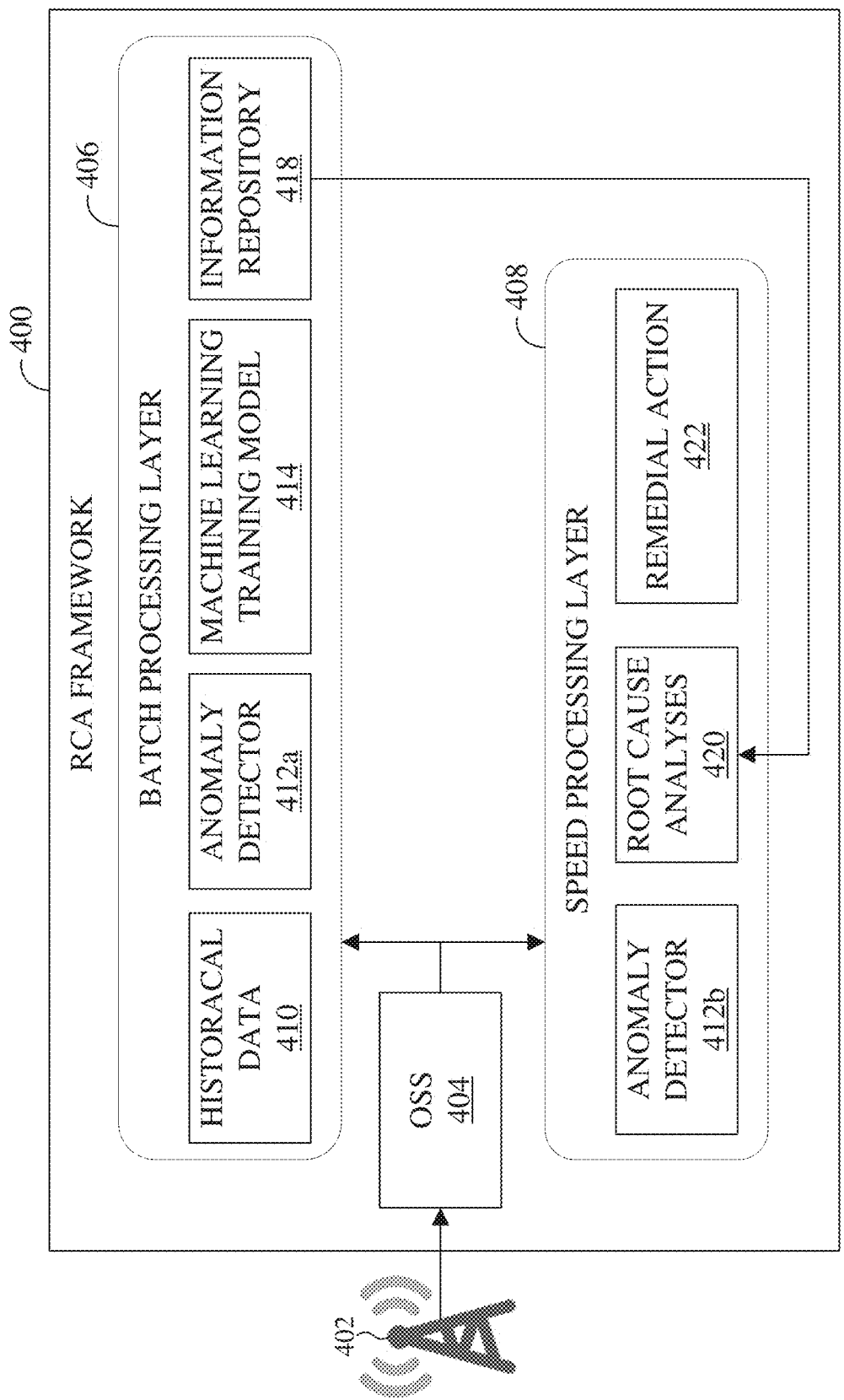
FIG. 4A illustrates a root cause analysis framework for using machine learning according to various embodiments of the present disclosure.

FIG. 4A illustrates an RCA framework 400 for using machine learning according to various embodiments of the present disclosure. The RCA framework 400 describes the process of applying machine learning for anomaly detection and root cause analysis. The RCA framework 400 can performed by an electronic device such as a server associated with one or more of the eNBs of FIGS. 1 and 3B, or a UE such as one of the UEs of FIG. 1 and FIG. 3A. For example, the RCA framework 400 can be included in the UE 116 of FIG. 3A. For another example, the RCA framework 400 can be included in a server (with similar components UE 116 of FIG. 3A) which receives data (such as the KPI and alarm data) via the backhaul or network interface 382, of FIG. 3B. The RCA framework 400 receives the data, detects anomalies from the data, and discovers underlying root causes of the detected anomalies and then executes corrective actions. The embodiment shown in FIG. 4 is for illustration only. Other embodiments are used without departing from the scope of the present disclosure.

The RCA framework 400 is a rules-based framework that both derives rules and utilizes the derived rules. The rules are in the form of Equation (1), below. The terms on the left-hand side of Equation (1) are the antecedents, while the terms on the right-hand side are the consequences. For example, KPI is an antecedent, while KQI is a consequence. That is, Equation (1) describes a cause and effect relationship between the KPI and the KQI.

$$KPI_1 \le v1, \ldots, KPI_m \le v_m \Rightarrow AD_{KQI} = 1 \qquad \text{Equation (1)}$$

The RCA framework 400 receives data from various sources, such as the source 402. The source 402 can be an eNB such as the eNB 101, 102, or 103, of FIG. 1, or a UE such as the UEs 111-116. The source 402 can also include including the Core Network and the Radio Access Network (RAN). The received data can include KPI data and alarms. KPI data is received periodically at predefined intervals (such as every fifteen minutes) while the arms are events that are generated at the eNB in response to a hardware or software failure.

The OSS 404 receives data from the various sources 402. The OSS 404 can include one or more information repositories for storing alarm data (such as FM data), KPIs including PM, and the like. The KPIs and alarms are indicative of the overall network health. KPIs can be in the form of counters (e.g. number of RRC connection attempts) or measurements (gauges) such as average IP throughputs per eNB within the last reporting interval. For example, real-time KPIs can come from various eNBs and arrive at periodic reporting intervals (RIs). Alarms are events, indicating problems or conditions, that are raised by hardware or by software processes. This information is used to ascertain the presence of anomalies or faults within the E-UTRA network, determine root causes, and execute corrective actions.

In certain embodiments, the OSS 404 preprocesses the KPIs and alarm data. In other embodiments, preprocessing the KPIs and alarm data is performed outside the OSS 404. Preprocessing involves manipulating the different sources of information from eNBs. Preprocessing is performed since large quantities of data are received, the data can be in varying or different formats. As such, preprocessing modifies the data such that it is usable in the RCA.

Preprocesses the KPIs, PM data, and alarm data enables the data to be further processed by the batch processing layer 406 and the speed processing layer 408. Preprocesses includes filling in missing values with special entries (e.g. NaN) to ensure they are not accidentally included during further downstream processing. The preprocessing can include discretizing KPI data (including PM data), deriving synthetic PM metrics, and generating a KPI hierarchy. The output of the preprocessed data results in data that can be used to detect anomalies and inferring the corresponding root causes of the detected anomalies. Preprocessing is discussed in FIGS. 5A-5H below.

The batch processing layer 406 and the speed processing layer 408 receive the data. The batch processing layer 406 generates rules for RCA based on the detected anomaly, from historical data. The rules identify an anomaly from the data and suggest a cause for the anomaly. The rules can also suggest one or more remedial actions that will resolve the detected anomaly. The speed processing layer 408, uses the generated rules for RCA in order to detect an anomaly from real time data and resolve the detected anomaly.

Anomalies are symptoms indicating that one or more service quality metrics for the operator network are outside their normal range, and troubleshooting is necessary to address the underlying causes. Anomaly detection involves detecting anomalies or departures in one or more of these KQI values, relative to their normal range of operation. Equation (2), below, describes a condition for identifying an anomaly. As shown in Equation (2), an anomaly is identified when the KQI is less than a threshold. After an anomaly is detected, the RCA framework 400 then discovers underlying root causes of the detected anomalies and then executes corrective actions based on the derived rules. That is, an anomaly is a symptom and the RCA is performed to identify the cause of the symptom and thereby determine a remedy for the detected anomaly such that the operator network returns to normal.

$$KQI \le T \qquad \text{Equation (2)}$$

The batch processing layer 406 receives the data from the OSS 404 and maintains the data in the historical data 410. The historical data 410 includes a previously processed KPIs and alarms. The previously processed KPIs and alarms that are maintained within the historical data 410 which is used by machine learning to identify anomalies within the data and generate rules (or conditions) for easily detecting an anomaly (based on a cause and effect relationship) as well as providing an understanding for the root cause of the issue in real time. The rules can also provide the steps needed to resolve the identified anomaly. In contrast, the speed processing layer 408 inspects newly received data (such as real-time data) to detect for anomalies, by applying the rules generated in the batch processing layer 406.

The anomaly detectors 412a and 412b identifies one or more anomalies from the KPIs and alarm data which indicate that the operator network are outside their normal range. The anomaly detectors 412a and 412b detects anomalies in one or more KQI categories relating to accessibility, retainability, availability, integrity (such as quality), and mobility. It is noted that the anomaly detector 412a detects anomalies from historical data 410 while the anomaly detector 412b detects anomalies from real time data. For example, the anomaly detector 412a looks at previous data (via the historical data 410) to identify sample patterns that correspond to operator network operations which are outside their normal range. The anomaly detector 412b looks at the real time data to identify patterns that correspond to operator network operations which are outside their normal range.

The KQI category of mobility measures how well the E-UTRAN mobility functionality is working. For example, mobility indicates whether a user experiences frequent dropped calls.

The KQI category of traffic measures the proportion of resource utilization at the cell during that RI. Larger amounts of resource utilization implies that that cell is over utilized and may reduce the service quality within that cell.

In certain embodiments, the input to the anomaly detectors 412a and 412b are time stamped. The inputs can be provided in streaming fashion (such as one sample per eNB per RI) or be provided in batch fashion (such as corresponding to historical data across one or more days/months of the year). For each KQI y∈Y={Accessibility, Retainability, Availability, Integrity, mobility} the anomaly detectors 412a and 412b outputs a function $AN_y$, whose value is non-zero if the KQI value for that data to be an anomaly sample. For each y, denotes as $KPI_j(y)$, the KPIs at level j in the KPI Hierarchy for y. Table (1), below, describes different KPIs within a tree hierarchy that can be used for anomaly detection for certain KQI categories.

TABLE 1

| KQI Category | KPI Categories | Definition |
|---|---|---|
| Accessibility | ErabAccessibilityInit | Success rate of Initial E-RAB establishment success rate |
|  | ErabAccessibilityAdd | Success rate of E-RAB establishment |
| Availability | EutranCellAvailability | Percentage of time that the cell is considered available |
| Mobility | EutraMobilityHoIntra | Calculated HOIntra success rate of E-UTRAN mobility |
|  | EutraMobilityHoInter | Calculated probability that an end-user successfully completes a handover to a separate eNB of the same frequency |
|  | EutranMobilityHoX2Out | Calculated HOX2Out success rate of E-UTRAN mobility |
|  | EutranMobilityHoS1Out | Calculated HOS1Out success rate of E-UTRAN mobility |
|  | EutranMobilityHoX2In | Calculated HOX2In success rate of E-UTRAN mobility |
|  | EutranmobilityHoS1In | Calculated HOS1In success rate of E-UTRAN mobility |
|  | EutranMobilityHoInterRatUtranIn | Calculated HOInterRatUtranIn rate of E-UTRAN mobility |
| Total PRB Usage (Traffic) | TotPrbDLAvg | Average rate of PRBs used to transmit PDSCH/PBCH/PMCH during the collection interval. It includes retransmission PRBs, all padding, and partial padding. |
|  | TotPrbULAvg | Average rate of PRBs used to transmit PUSCH during the collection interval. The denominator, which indicates the total number of available uplink PRBs, excludes the number of PUCCH and PRACH PRBs. The average rate includes retransmission PRBs, all padding, and partial padding. |
| Integrity | EutranIpThroughput | Average IP throughput for that cell in the DL |
|  | ULIpThruAvg | Average IP throughput for that cell in the UL |

In certain embodiments, there are multiple categories of KQI which correspond to an anomaly. The KQI category of accessibility provides the probability for an end-user to be provided with an E-UTRAN Radio Access Bearer (E-RAB) upon request. For example, service accessibility indicates the ease of establishing a connection with a cell.

The KQI category of retainability provides a measurement of how often an end-user abnormally loses an E-RAB during the time the E-RAB is used. For example, retainability indicates the ability to retain a connection.

The KQI category of availability provides a measurement of the percentage of the time the cell is available. For example, availability indicates whether the system is unable to detect the presence of a cell.

The KQI category of integrity provides a measurement of IP throughput on the download and upload direction. For example, integrity indicates the user quality an experience and can be based on download speeds.

Embodiments of this disclosure provide three different anomaly detection methods for the anomaly detectors 412a and 412b. The detection methods include (i) extreme outliers, (ii) standard deviation, and (iii) median absolute deviation (MAD).

With respect to the extreme outlier method, the anomaly detectors 412a and 412b identify an anomaly if at least one KPI that is within a KPI Hierarchy (such as the KPI tree hierarchy 520 of FIG. 5B) is below a threshold for a certain KQI. The threshold can be set to a fixed value or computed based on the hourly KPI statistics.

With respect to the standard deviation method, the anomaly detectors 412a and 412b identify an anomaly if one or more KPI that is within a KPI Hierarchy (such as the KPI tree hierarchy 520 of FIG. 5B) is below k standard deviations below the mean for that KPI for a certain KQI. The standard deviation method is described in Equation (3), below.

$$AN_y = \begin{cases} > 0, \text{ if } \exists \ j \text{ s.t. } KPI_j(y) < \mu_{KPI_j} - k \cdot \sigma_{KPI_j} \\ 0, \text{ otherwise} \end{cases} \quad \text{Equation (3)}$$

With respect to the MAD, the anomaly detectors 412a and 412b identify an anomaly based on the median of the set comprising of the differences between each sample point and the sample median. For example, an anomaly is detected if the KPI value is less than or equal to $\text{Median}_{KPI_j} - t_j \cdot \text{MAD}$ where $\text{Median}_{KPI_j}$ designates the median value for $KPI_j$ during the hourly interval to which the RI belongs. The term $MAD_j$ is a function of the median of the absolute deviations of the KPI from its median hourly KPI. The parameter $t_j$, known as the anomaly detection threshold, is used to control the number of detected anomalies for KPI j. The MAD method for anomaly detection is described in Equation (4) below.

$$AN_y = \begin{cases} > 0, \text{ if } \exists \ j \text{ s.t. } KPI_j(y) < \text{Median}_{KPI_j} - t \cdot MAD_{KPI_j} \\ 0, \text{ otherwise} \end{cases} \quad \text{Equation (4)}$$

For example, to identify a $\text{MAD}_{KPI_j}$ for an input that is a KPI series Y and an anomaly detection threshold, t, the first step is to extract $X=\{y: \Pr[Y \leq y] \leq 0.2\}$. It is noted that values of Y lying above 20th percentile is ineligible to be anomaly samples. The second step is to solve for MAD, where $\text{MAD}=c \times \text{Median}[|X-\text{Median}[X]|]$. To identify C, the standard distribution of X identified is based on Calculate $\tilde{X}=(X-\mu_X)/\sigma_X$, such that $c=1/z$ where z is such that $\Pr[\tilde{X} \leq z]=0.75$. Step 3: For each x lying in X, the MAD method defines Define M-score=$(x_i-\text{Median}[X])/\text{MAD}$. The M-score is compared against the threshold, such that an anomaly is identified if M-Score less than the threshold, t.

The machine learning training model 414 generates rules for identifying the detected anomalies, via the anomaly detector 412a, from the historical data 410. Machine learning training model 414 also generates parameters for identifying anomalies from the historical data 410. The rules and parameters can also be used for performing the RCA for a detected anomaly as well as provide one or more remedial actions to resolve the detected anomaly. Equation (5), below, describes an example rule that is used in an RCA. Generating the rules and the parameters by the machine learning training model 414 is discussed in greater detail below.

$$KPI_1 \leq v_1, KPI_2 \leq v_2 \Rightarrow KQI_{anomaly}=1 \quad \text{Equation (5)}$$

The RCA framework 400 is also able to evaluate the quality of each derived rule. If S, denotes the set of the historic data 410, then $A_{KQI} \subseteq S$ denotes a set containing sample anomalies for a certain KQI. Similarly, $F_j \subseteq S$ denotes the set whose entries satisfies the relations for Rule j. Equations (6), (7), and (8) describe various metrics for quality of each derived rule. For example, the support of Equation (6) is the relative proportion of KPI samples obeying the antecedent of the rule. For example, the higher the confidence score, of Equation (7), indicates that the derived rule withstands an increasing number of samples with KQI anomalies than normal samples. The confidence score, of Equation (7), is also referred as the precision or posterior, and refers to the fraction of anomaly samples obeying rule j. This is equivalent to the conditional probability $\Pr(s \in A_{KQI} | s \in F)$. Higher confidence rules better discriminate anomaly samples from normal samples. Similarly, the higher the hit ratio, of Equation (8), indicates that the derived rule can be applied for most KQI anomaly samples. The hit ratio, of Equation (8), also referred as recall or likelihood, corresponds to the fraction of KQI anomalies that are associated to rule j. This is equivalent to the conditional probability $\Pr(s \in F | s \in A_{KQI})$.

$$\text{Support} = \frac{|F_j|}{|S|} \quad \text{Equation (6)}$$

$$\text{Confidence (or Precision)} = \frac{|F_j \cap A_{KQI}|}{|F_j|} \quad \text{Equation (7)}$$

$$\text{Hit Ratio (or recall)} = \frac{|F_j \cap A_{KQI}|}{|A_{KQI}|} \quad \text{Equation (8)}$$

Once generated via the machine learning training model 414, the rules and parameters that satisfy a design target such as a minimum support and confidence (which could be any present threshold, such as 80%) are maintained in the information repository 418. The information repository 418 can be similar to memory 360 of FIG. 3A or the memory 380 of FIG. 3B. The information repository 418 can store one or more rules that are used to identify an anomaly and the root cause of the anomaly. The rules stored in the information repository 418 can be used as fingerprints to check for matching rule(s), such as checking whether the KPIs for anomaly samples obey these rules or not. If a rule match is found, then an explanation can be provided at a user interface to interpret the physical meaning of the rule so that a human operator can infer the underlying root cause for that anomaly occurrence.

In certain embodiments, the information repository 418 also includes a knowledge base that is derived using the human domain expertise. In certain embodiments, the data within the information repository 418 is applied to the PM to order to prepare the data in a format that is amendable for executing the RCA and the corrective actions.

Once the rules that imply a degradation in performance with high confidence are generated, the RCA framework 400 identifies which of the generated rules correspond to root causes and which of the generated rules correspond to associated symptoms. The following three examples describe identifying which rules correspond to the root cause of a KPI degradation.

In certain embodiments, a chained rule $r \in \mathcal{R}$, is a set of rules on certain KPIs, given as $r = \{(KPI_1=1, KPI_2=0, \ldots KPI_n=1) \Rightarrow > KQI=1\}$ having high confidence. Chaining rules together is described in greater detail below with respect to FIG. 5C. Thereafter, relations between the basic rules in r using a directed graph are established. First the set of rules in r are separated to basic and non-basic rules and all the basic rules are considered as nodes in a graph. Next, all non-basic rules are satisfied and add a directed edge between a pair of basic rules ($KPI_i=1$, $KPI_j=1$) are consider if the confidence of the rule ($KPI_i=1 \Rightarrow KPI_j=1$), i.e., $P(KPI_j=1|KPI_i=1)$ is above a threshold. Thus, a directed edge indicates causational relation between the nodes, i.e., $KPI_j=1$ is a symptom of $KPI_i=1$ or $KPI_i=1$ results in occurrence of $KPI_j=1$. The nodes with no incoming edges indicate that they are not caused by any other basic rule and thus are defined to be a root cause for the chained rule, while the rest are identified as the symptoms.

In another embodiment, when the KPI hierarchy tree is constructed (as described in FIG. 5C, below), the processor can identify that that the leaf node of the chained rule as the root cause and other rules as the accompanying symptoms In yet another embodiment, all of the generated rules are considered to be nodes in a directed graph. Then an edge among the nodes is added using the similar approach as above (in the first example). If bi-directional edges exist between any two nodes, it is collapsed into one node, by the processor. The nodes with no incoming edges are defined as the root causes for the KQI. All possible paths from these nodes to the KQI node, are now the new set of chained/compounded rules, with nodes along the path being the symptoms.

With respect to the speed processing layer 408, after the anomaly detector 412*b* identifies an anomaly in real-time, the RCA 420 using information form the information repository 418 identifies the cause of the detected anomaly. For example, the RCA 420 uses the machine learned rules (from the machine learning training model 414 that are above the confidence and hit ratio thresholds) to identify the underlying root causes of the detected anomaly.

In certain embodiments, after the RCA 420 determines the root causes for the detected anomalies, an explanation of the root cause as well as the remedial action 422 can be displayed, on a user interface. When the remedial action 422 is displayed it can include recommended action(s) to perform in order to restore the network to its normal functioning state. In other embodiments, the remedial action 422 performs the necessary actions to restore the network to its normal functioning state automatically. The remedial action 422 can apply a corrective action as a function of the determined root cause that is responsible for the degradation of the KQI of interest.

After the root causes and explanations are determined, the next step of the RCA framework 400 is to execute the set of corrective actions (remedial action 422) for correcting the underlying causes leading up to the anomaly and restoring the network to its normal functioning state.

In certain embodiments, for determining the corrective actions, the RCA framework 400 uses a machine learning inference engine (not shown). The machine learning inference engine identifies the correct set of restorative actions based on a set of feature inputs. For example, machine learning inference engine can be trained using labeled data provided from historical data 410. For instance, the machine learning inference engine is trained using job logs, CM data and the like, that is maintained in the historical data 410. The training labels provide the optimal corrective action c for each feature vector lying within the training set x.

To generate the training given job logs and CM data, the CM data consisting of eNB configuration that is stored across multiple dates is compared between one day to the next and only the changes applied to the configuration parameters are retained. This is collated in time against the corresponding dates when an anomaly was resolved. As such, labeled data is generated that identifies the nature and magnitude of eNB configuration parameter changes, as well as what was the underlying root cause/symptom for which those changes were applied.

The inputs to the machine learning inference engine is a feature vector $x=[x_1, x_2, \ldots x_n]$. Each entry in this vector is pre-processed PM data that is either continuous valued or discrete valued. Examples of the entries could include the KPIs (such as DLSchedulerMcsRatio, ULSchedulerMcsRatio, RssiPath0Avg, RssiPath1Avg, DLResidualBlerRetrans0, described below). The output of the machine learning inference engine is the corrective action $c \in \{C_1, C_2, \ldots, C_K\}$. Possible actions include increasing the antenna downtilt (in order to reduce overshooting), decreasing the antenna downtilt (in order to increase RF coverage), adjusting one or more RRC parameters, such as UE power control parameters, RS-to-data energy per resource element), or adjusting one or more scheduling parameters (in order to increase priority provided for GBR radio bearers).

As discussed above, preprocessing the PM data and alarm data enables the data to be further processed by the batch processing layer 406 of FIG. 4A and the speed processing layer 408 of FIG. 4A. Preprocessing the PM data is based on (i) discretizing PM data, (ii) deriving synthetic PM metrics, and (iii) generating the KPI hierarchy. The output of the processed PM data can be used to detect anomalies and their corresponding infer root causes. Processing the alarm data includes relating the PM data and the alarm data. FIGS. 5A-5H describe preprocessing the PM data and alarm data. The embodiments of FIGS. 5A-5H are for illustration only. Other embodiments can be used without departing from the scope of the present disclosure.

KPI discretization increases the efficiency for rule mining and processing for subsequent RCA. In certain embodiments, continuous valued PM data can be used, for rule mining and processing for subsequent RCA, however, discretized PM data is more efficient than using continuous valued PM data.

Discretization can be performed based on comparing the KPI data against fixed threshold or a statistical threshold. Discretization using a statistical threshold involves first obtaining a statistical distribution of PM data across a certain time interval (such as daily, hourly, and the like). The distribution can be obtained at pre-specified quantile values such as the 10th quantile, the 70th quantile, or the 100% quantile. Next, the PM data is binned to determine which quantile interval PM data falls under. For example, Bin 0 can correspond to PM data lying below 10th quantile, Bin 1 can corresponds to PM data lying between $10^{th}$ quantile and 90th quantile, and Bin 2 can correspond to outliers such as PM data that is greater than $90^{th}$ quantile. It is noted that for synthetic PMs, in cases when the PM is invalid (such as set to NaN if no measurements are available), a special quantization bin is set aside.

In certain embodiments, the thresholds employed for discretizing PM data for RCA (such as extracting rules in the form of Equation (2), above) can be selected as a function of the thresholds employed for categorizing KQI anomalies. For example, if the anomaly detection thresholds are chosen such that greater number of samples are declared as experiencing an anomaly at the KQI of interest. Then, the PM thresholds for RCA purposes could be correspondingly changed so that the RCA framework 400 will attempt to find root causes for the larger number of KQI anomaly samples.

Adaptively adjusting the PM thresholds for RCA purposes as function of the thresholds for detecting degraded KQI anomalies provide a reasonable trade-off between high rule confidence (based on Equation (7), which corresponds to the fraction of samples for which a rule applies that are also declared as anomaly samples) and high hit ratio (based on Equation (8), which corresponds to a fraction of anomaly samples for which a rule holds).

If the threshold for marking a certain KQI sample as an anomaly is chosen to be more stringent, then fewer KQI event occurrences are categorized as anomalies. For example, an anomaly detection algorithm that categorizes throughput samples below 1 Mbps as anomalies will classify fewer throughput anomaly samples, compared to one that categorizes samples below 5 Mbps.

Figure 4B:
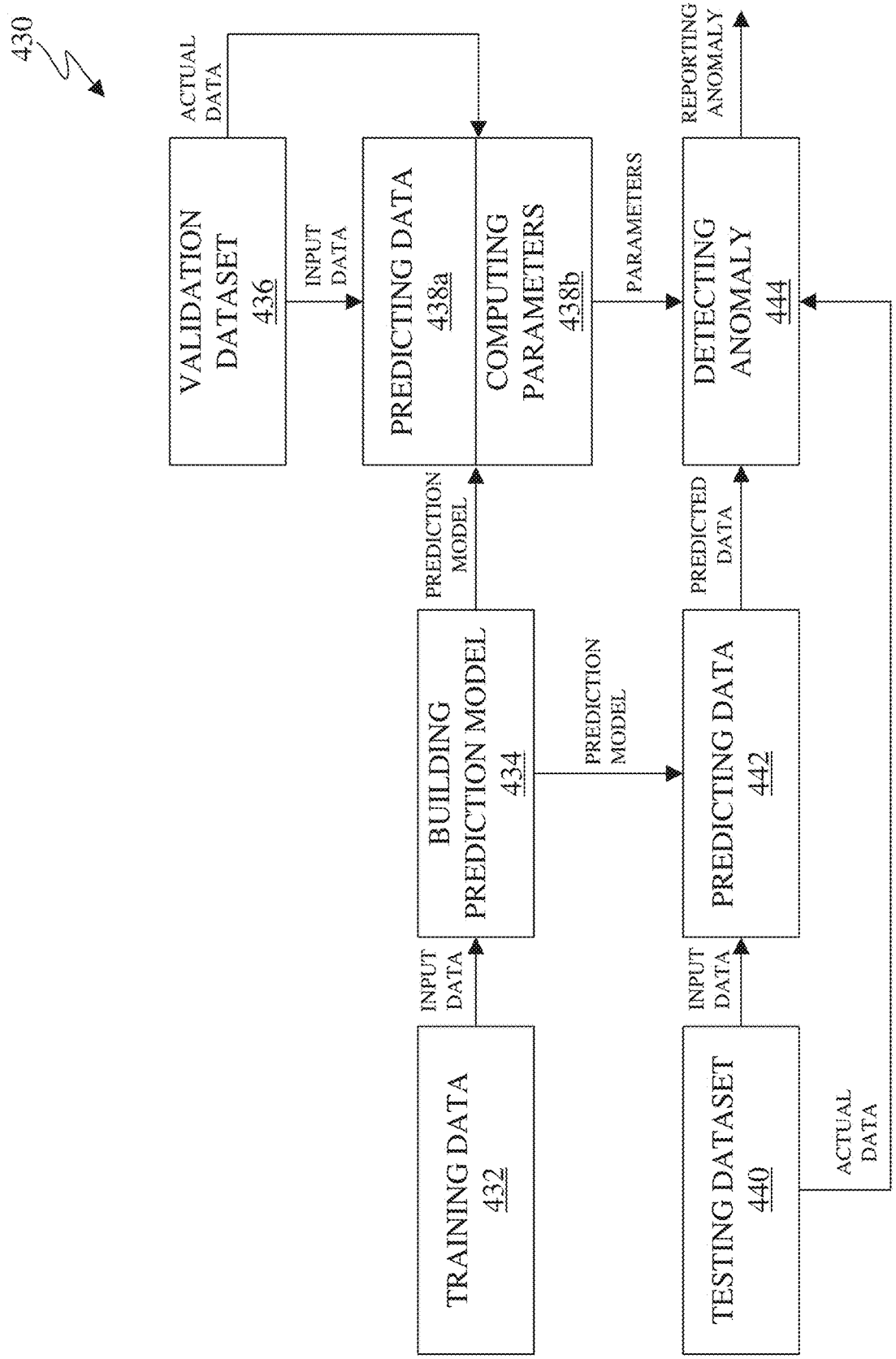
FIG. 4B illustrates a block diagram for traffic forecasting based anomaly detection according to various embodiments of the present disclosure.
Figure 4C:
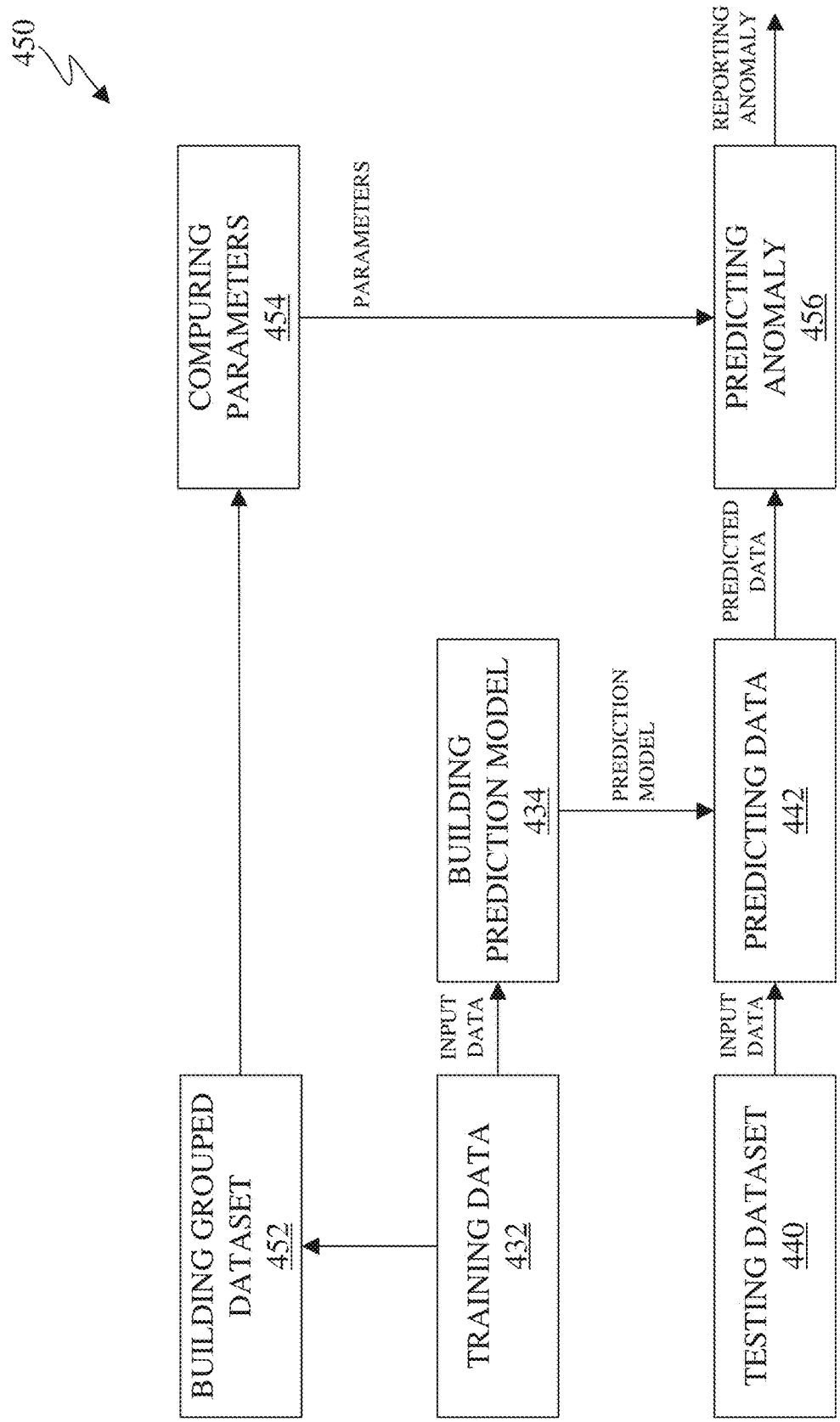
FIG. 4C illustrates a block diagram for traffic forecasting based on anomaly prediction according to various embodiments of the present disclosure.

In certain embodiments the RCA framework 400 also performs KPI forecasting based on IP throughput using the historical data 410. FIG. 4B illustrates a block diagram 430 for traffic forecasting based anomaly detection according to various embodiments of the present disclosure. FIG. 4C illustrates a block diagram 450 for traffic forecasting based on anomaly prediction according to various embodiments of the present disclosure.

In certain embodiments, the RCA framework 400 can automatically make prediction on the data in future time based on a trained predicted model. The anomaly alarm rises once a difference between the predicted data and the actual incoming data is larger than some certain threshold. For example, a machine learning framework for traffic forecasting based anomaly detection and anomaly prediction, respectively would increase the efficiency of the RCA framework 400.

A machine learning based KPI forecasting is based on historical data using feature engineering. A single feature approach can be based on IP throughput, while a multifeatured approach can be based on various parameters such as the hour of the day, number of the active users within a certain geographic area, and the like. Based daily, monthly, seasonal, yearly (and various other time intervals) the RCA framework 400, using a long short-term memory (LSTM) neural network or a quantile regression forest can detect as well as predict IP throughput anomalies in the network. for example, at every timestamp, the RCA framework 400 can predict a quantity of data that will appear in the future. Upon receipt of the actual data, the RCA framework 400 compares the quantity of the predicted data to the actual quantity data. If the difference between the predicted data and the actual data exceeds a threshold, the anomaly detector 412b identifies an anomaly.

An example dataset for making a time series traffic forecasting is shown in Table (2), below. The dataset of Table (2) describes system records data that includes different KPIs within the overall network. KPIs are of the form of counters (e.g. number of RRC connection attempts) or measurements (gauges) such as average IP throughputs per eNB within the last reporting interval. Table (2) gives the description of the features that were used in anomaly detection and anomaly prediction.

TABLE 2

| | |
|---|---|
| TotPrbDLAvg | Average rate of PRBs used to transmit PDSCH/PBCH/PMCH during the collection interval. It includes retransmission PRBs, all padding, and partial padding. |
| TotPrbULAvg | Average rate of PRBs used to transmit PUSCH during the collection interval. The denominator, which indicates the total number of available uplink PRBs, excludes the number of PUCCH and PRACH PRBs. The average rate includes retransmission PRBs, all padding, and partial padding. |
| EutranIpThroughput | Average IP throughput for that cell in the DL |
| ULIpThruAvg | Average IP throughput for that cell in the UL |
| UEActiveDLAvg | Average UE number in DL |
| UEActiveULAvg | Average UE number in UL |
| Time Stamp | The recorded time stamp when data sent |

The block diagram 430 of FIG. 4B depicts traffic forecasting based machine-learning aided anomaly detection framework. The system first collects historical data, a subset of which is used for training a traffic forecasting model based on Deep Learning/Machine Learning technique. The historical data for traffic forecasting can be the same historical data 410 of FIG. 4. Based on the prediction model, the system makes prediction on the amount of data traffic or the IP throughputs over uplink or downlink, in future time stamps. It is noted that the term "data" could refer either to the uplink or downlink traffic volume, IP throughputs and the like. To evaluate the forecasting accuracy, the validation data 436 to get the predicted data 438a, and also compare it to the actual data that come in the future time stamp. Since the dataset is a time series, an error vector can be generated by comparing the differences between the predicted data vector and the ground truth data vector. Once the error vector is obtained, the RCA framework 400 can compute statistical parameters of the error such as the empirical mean, variance, standard deviation and the like, and record them in a data base.

In a streaming data scenario, at every time stamp, the model predicts data that will appear in the future time stamp. Upon receipt of the true data at that time stamp, one compares predicted data against the ground truth (actual data). If the difference between them is exceeds an absolute or relative threshold, the system declares that an anomaly. The selection of the anomaly detection threshold depends on which anomaly detection method is used.

The input data is the set of data in the past time stamps, which could be single or multiple features. The Actual Data is the data that comes in future time stamp. The training data 432 includes the historic data collected by the system that used to train the prediction model. The Building Prediction Model 434 is trained based on the training dataset 432. For example, the Building Prediction Model 434 are based on Deep Learning (such as LSTM) and Machine Learning method (Quantile Regression Forests). The validation dataset 436 generates the error vector by computing the difference between the predicted data vector and the actual data vector. The Computing Parameters 438b takes the error vector from the validation dataset 436 and identifies the mean, variance, standard deviation, or other parameters that involve the statistical distribution of the error vector. The testing dataset 440 is the dataset that is used for real time testing. The validation data set 436 includes the historic data that is used to validate the prediction model and generated the parameters. Detecting Anomaly 444 detects if the actual data is anomaly or not. Based on which anomaly detection method that the system will choose, this function works differently. For a Standard Deviation method the Detecting Anomaly 444 detects anomaly by checking if the error that between the predicted data and actual data is larger than a given threshold, which is decided by the parameters obtained in validation. For the Tukey's method the Detecting Anomaly 444 chooses not to use the parameters that obtained in validation dataset, but detects anomaly just based the predicted data interval and actual data.

The block diagram 450 of FIG. 4C depicts traffic forecasting based machine-learning aided anomaly prediction framework. Similar to the traffic forecasting based anomaly detection of FIG. 4B, the block diagram 450 of FIG. 4C obtains a prediction model based on the historic data first. Then the block diagram groups the historic data based on the time stamp in same time slot (such as same hour, or same hour-minute). For example, all the past data whose time stamp is in the time interval of 2:00 pm to 3:00 pm, fall in the same group. Once the grouped dataset is built, the system computes the parameters, such as mean, standard deviation, by each group. In the anomaly prediction phase, at each time stamp, the system first predicts the data that will come in the future time stamp. Then, by comparing the predicted data against an expected value or interval determined via statistical information from historical data in that particular time stamp, the system predicts whether the forecasted traffic constitutes an anomaly.

The Building Grouped Dataset groups the historic data (such as the historic data 410 of FIG. 4A) based on their time stamp. To the data whose time stamp is same in the hour and minute, the system put them into same group The Computing Parameters 454 identifies the mean, variance, standard deviation, and other statistical parameters, of each dataset group. The Predicting Anomaly 456 predicts an anomaly based on the data which will come in future time stamp. Based on which anomaly prediction method that the RCA framework 400 chooses, this function works differently. For the Standard Deviation method, at each time stamp, the predicting anomaly 456 predicts an anomaly by checking if the error that between the predicted data and the mean of the historic data in next time stamp group is larger than a given threshold, which is decided by the parameters. For the Tukey's method, at each time stamp, the predicting anomaly 456 predicts anomaly by checking if the mean of the historic data in next time stamp group falls into a range that decided by the prediction interval.

In certain embodiments, KPI forecasting based on IP throughput using the historical data 410 includes data which is pre-processed using a moving window average. Since raw traffic data arrives regularly at certain intervals (such as 15 minute intervals) includes various bursts, a pre-processing step applies a filter to reduce its variance. In certain embodiments, a processor calculates the moving average on the raw data. The moving average is based on the express $$\bar{x}(i) = \frac{\Sigma_{j=0}^{T_w} x(i-j)}{T_w}.$$

It is noted that $\bar{x}(i)$ is the data after taking moving window average at time stamp i, x(i) is the raw data at time stamp i, and $T_w$ is the size of the moving window. Note that applying the moving window does not change the sizes of the outputs relative to that of the inputs. If the KPIs are reported once per 15 minutes, $T_w$ is set to 1 hour, which covers four sample points in the window. That is, the RCA framework 400 loads the raw data and then takes the moving window average to smooth the network traffic curve.

In certain embodiments, KPI forecasting based on IP throughput using the historical data 410 includes data which is pre-processed using data binning. Data binning is primarily used with Deep Learning and multiple features input. The features, except the Downlink/Uplink throughput, that are used in LSTM prediction are: UEActiveDLAvg/UEActiveULAvg, TotPrbDLAvg/TotPrbULAvg, and Time Stamp. The data is then quantizes into multiple bins.

For example, for Number of active users in DL (UEActiveDLAvg) and UL (UEActiveULAvg), the average UE number in Downlink/Uplink are binned into four groups. For instance, (i) bin 0 corresponds to the average UE number between 0 and 5, (ii) bin 1 corresponds to the average UE number between 5 and 10, (iii) bin 2 corresponds to the average UE number between 10 and 20, and (iv) bin Bin 3 corresponds to the average UE number beyond 20.

For another example, TotPrbDLAvg/TotPrbULAvg, the quantized the PRBs utilization in Downlink/Uplink are binned into four bins. For instance (i) bin 0 corresponds to the average rate of PRBs between 0 and 30, (ii) bin 1 corresponds to the average rate of PRBs between 30 and 65, (iii) bin 2 corresponds to the average rate of PRBs between 65 and 95, (iv) bin 3 corresponds to the average rate of PRBs between 95 and 100.

For yet another example, time stamp can be binned by the hour. That is, bin 0 can correspond to the hours between 0:00 am to 6:00 am, bin 1 can correspond to the hours between 6:00 am to 12:00 am, bin 2 can correspond to the hours between 12:00 pm to 6:00 pm, and bin 3 can correspond to the hours between 6:00 pm to 12:00 am.

In certain embodiments, time series traffic forecasting can be based on both LSTM and machine learning, where the inputs can be a (i) single feature input, (ii) multiple feature inputs, and (iii) clustered single feature input. That is, LSTM predicts the throughput data in a future time stamp. For example, for a given input, x, there can be two LSTM layers followed by a fully-connected (dense) layer, to generate a single output, o. The dense layer has a single output corresponding to the forecasted traffic. Since the performance of time-series traffic forecasting relies on the selection of the input features, different inputs, (such as single feature input, multiple feature inputs, clustered single feature input) can alter the outcome.

For the single input feature, only single feature's data is input into LSTM for training the prediction model. The single input feature can be expressed as $o(i)=x_p(i)=\text{LSTM}(\{x(i-j)\}_{j=1}^{L})$, where $x_p(i)$ is the predicted data at time stamp i, x(i−j) is the actual data at time stamp i−j, $\{x(i-j)\}_{j=1}^{L}$ is the sequence with size of L, and L stands for how many past time stamps that the LSTM uses for making prediction. In certain embodiments, the input is the throughput samples in the past period.

For the multiple feature inputs LSTM takes the data from multiple features as the input. The multiple feature inputs can be expressed as $o(i)=x_p(i)=\text{LSTM}(\{x^{(1)}(i-j)\}_{j=1}^{L}, \{x^{(2)}(i-j)\}_{j=1}^{L})$, where $x_p(i)$ is the predicted data at time stamp i, $x^{(k)}(i-j)$ is the actual data of k-th feature at time stamp i−j, K is the total number of features as the input, $\{x^{(k)}(i-j)\}_{j=1}^{L}$ is the sequence of the data in k-th feature with size of L, and L stands for the number of past time stamps used for prediction. Same to above section, here LSTM stands for the overall Deep Learning network with dense layer size is 1.

It is noted that the single input feature and the multiple feature inputs are from a single cell. The clustered single input feature performs traffic forecasting on multiple cells at same time based on the past data from all these cells. That is, the clustered single input feature can use data not only in time domain, but also across the spatial domain (across multiple eNBs and cells). In order to balance the computing cost and the prediction coverage on cells, the clustered single input feature devices the entire network into multiple clusters, and train the prediction model by each cluster. As such, the clustered single input feature can be expressed as $o(i)=(x_p^1(i), x_p^2(i), \ldots, x_p^N(i))=\text{LSTM}(\{x_1(i-j)\}_{j=1}^{L}, \{x_2(i-j)\}_{j=1}^{L}, \ldots, \{x_N(i-j)\}_{j=1}^{L})$, where $(x_p^1(i), x_p^2(i), \ldots, x_p^N(i))$ is the prediction result for all N cells at i-th time stamp in a given cluster, $x_d(j)$ is the actual data in d-th cell t time stamp j, $\{x_d(i-j)\}_{j=1}^{L}$ is the sequence of the past data in d-th cell, L stands for the number of past time stamps, and N is the number of cells in the cluster. In certain embodiments, the cluster could be a single cell or a group of cells within a certain geographical area. In other embodiments, the cluster of cells could be grouped as function of their cell coverage (using downlink transmit power, capability such as whether the cell is a Macro or Pico cell), operating carrier frequency, radio access technology (e.g. whether 4G LTE, 5G New Radio), and the like. The above approach can also consist of additional embodiments such as multiple feature inputs are available from each cell.

Figure 4D:
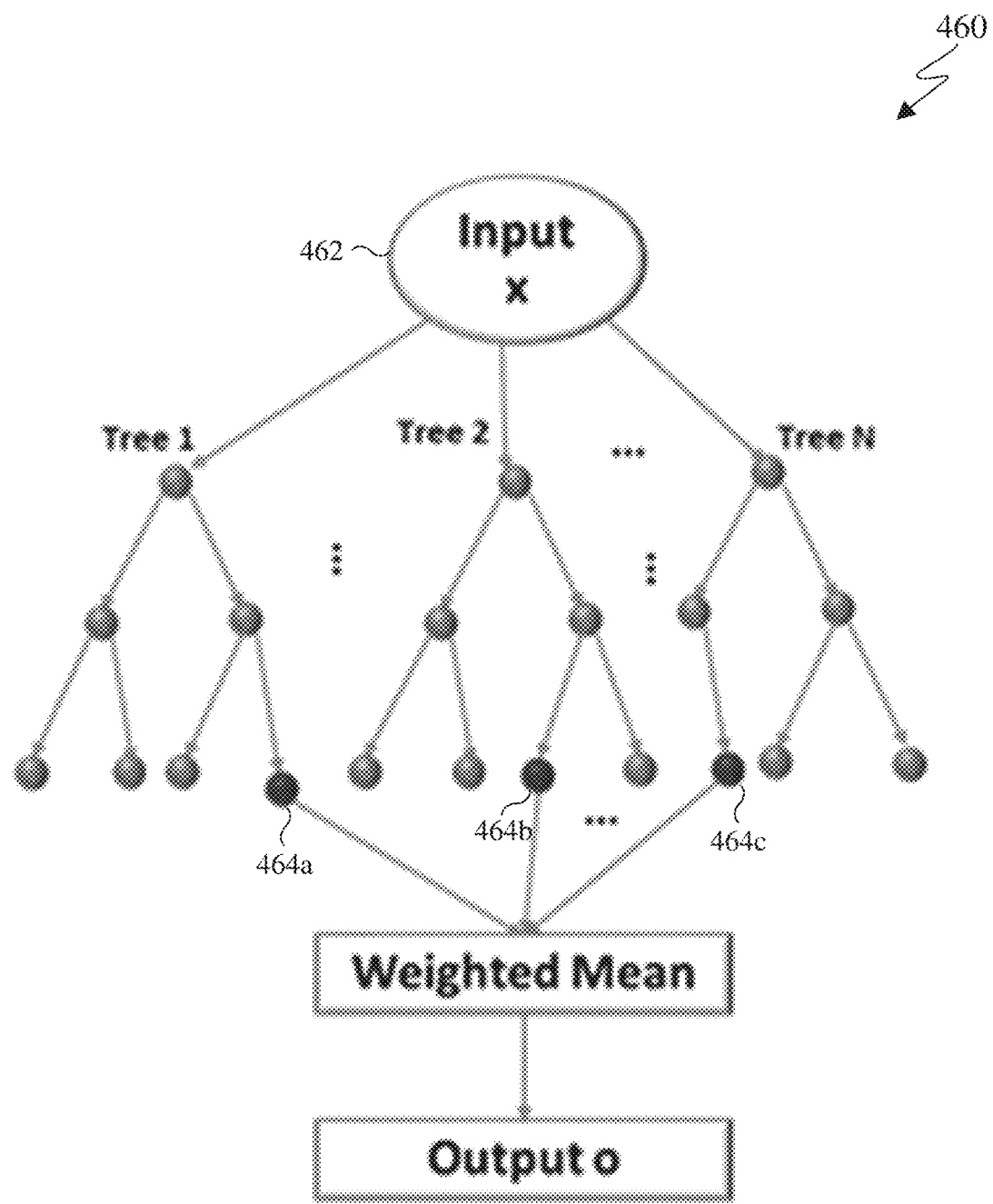
FIG. 4D illustrates an example framework of quantile regression forest, according to various embodiments of the present disclosure.

In certain embodiments, time series traffic forecasting can be based on a quantile regression forest based traffic forecasting. Quantile Regression Forests is a modified version of Random Forest algorithm, for high-dimensional regression and classification. FIG. 4D illustrates an example, framework 460 of quantile regression forest, according to various embodiments of the present disclosure. The input 462 is the input features. For example, for a given input, X=x, the conditional distribution for Y is smaller than y is $F(y|X=x)=P(Y\leq y|X=x)$, where Y is the responsible variable corresponding to the predictor variable X. The Quantile Regression Forests approximates the conditional distribution as $F(y|X=x)=P(Y\leq y|X=x)=E(1_{\{Y\leq y\}}|X=x)$. The estimation of the distribution function $F(y|X=x)$ is obtained by taking the weighted mean on the leaf's that x falls into (such as leaf's 464a, 464b, and 464c). Since the α-quantile is computed as $Q_\alpha(x)=\inf\{y: P(Y\leq y|X=x)\geq\alpha\}$, which enables the identification of a prediction interval $I_\alpha(x)$, for a given input x and probability α, as $I_\alpha(x)=[Q_{(1-\alpha)/2}(x), Q_\alpha(x)]$. It is noted for that only past throughput samples are used in single cell as input, and the output is the prediction interval on the throughput at next time stamp. This can be expressed as $o(i)=I_\alpha(x)=QRF(\{x(i-j)\}_{j=1}^L)$, where $I_\alpha(x)$ stands for the prediction interval at time stamp i, x(i−j) is the actual data at time stamp i−j, $\{x(i-j)\}_{j=1}^L$ is the sequence of data with size of L, and L stands for the number of past time stamps that used for making prediction. QRF stands for the Quantile Regression Forests.

As described above in FIG. 4B, traffic forecasting for anomaly detection can be based on a standard deviation based anomaly detection, or a tukey based anomaly detection. With respect to the standard deviation based anomaly detection, after the traffic forecasting model is built, the first step includes using the validation dataset 436 to measure the model's prediction ability and compute the prediction error. The prediction error is expressed as err$a=(x_p(1)-x(1), x_p(2)-x(2), \ldots, x_p(T)-x(T))$, where err$_{val}$ is the error vector on validation dataset, x(i) is the actual data at time stamp i, $x_p(i)$ is the predicted data at time stamp i, and T is the size of the prediction vector. Based on the error vector err$_{val}$, the second step includes identifying the standard deviation. The block 4389b identifies the parameters such as the standard deviation. The standard deviation is expressed as std$_{val}$=STD(err$_{val}$, T$_w$), where std$_{val}$ is the standard deviation on the error vector, and STD stands for the function that computes standard deviation. Here T is the time window on which the data is used to computing the standard deviation. For example, if T=8 and T=24, then there are 3 Standard Deviation values corresponding to their time range. The block diagram 430 can store these parameters for applying anomaly detection in future. When running, at every time stamp i−1, the traffic forecasting method automatically makes prediction on the data that will come in the next time stamp i, based on the past data samples. For example, by comparing the predicted data to the actual data, a an anomaly exists when $|x_p(i)-x(i)|\geq k*std_{val}$ is satisfied.

With respect to the tukey based anomaly detection, a prediction interval is needed before applying the anomaly detection. In the first step, the prediction interval in the testing dataset is acquired. Next the interval is divided into four quarters. An anomaly is detected based on the quarters. For example, When the traffic forecasting method makes prediction on the data that will appear at time stamp i, by running Quantile Regression Forests, it gets a prediction interval $I_\alpha(x)$. For a given prediction interval $I_\alpha(x)$, it is divided into four quarters, where their boundaries defined by $Q_1$, $Q_2$ and $Q_3$. For example, if $I_\alpha(x)=[1, 3]$, then $Q_1=1.5$, $Q_2=2$, $Q_3=2.5$. When the actual data x(i) which comes at time stamp I a sever anomaly is likely if $x(i)<Q_1-3|Q_3-Q_1|$ or $x(i)>Q_3+3|Q_3-Q_1|$, is satisfied. When the actual data x(i) which comes at time stamp I a possible anomaly is likely if $Q_1-3|Q_3-Q_1|<x(i)<Q_1-1.5|Q_3-Q_1|$ or $Q_3+1.5|Q_3-Q_1|<x(i)<Q_3+3|Q_3-Q_1|$, is satisfied.

As described above in FIG. 4C, traffic forecasting for anomaly prediction can be based on a standard deviation based anomaly prediction, or a tukey based anomaly prediction. With respect to the standard deviation based anomaly prediction first, the historical data is grouped by time stamp, then the parameters are identified for each group, and finally the predicting anomaly 456 can predict an anomaly from the testing dataset 440. For example, after collecting the historic data, the first step of the block diagram 450 groups the data based on the data's time stamp. That is, to the data whose hour and minute is same, the system put them into a group. The group can be expressed as $x_k=(x(t_1^k), x(t_2^k), \ldots, x(t_T^k))$, where $\{t_1^k, t_2^k, \ldots, t_T^k\}$ is the set of time stamps, who have same hour-minute value k, with size of T, and $x_k$ is the k-th data group that contains all of them. After the dividing the dataset by time stamp group, the second step, the computing parameters 438a identifies the mean and standard deviation on each group. The mean is expressed as mean$_k$=MEAN($x_k$), while standard deviation is expressed as std$_k$=STD($x_k$, T$_w$) for each group. It is noted that T$_w$ is the same as the time window on which the data is used to computing the STD. The system stores the mean and STD for each time stamp group. After predicting the data that will appear at next time stamp i, the third step of the block diagram 450 makes the anomaly prediction at the same time stamp, based on the predicted data $x_p(i)$. For example, an anomaly is high at time stamp I when $|x_p(i)-mean_k|\geq k*std_k$.

With respect to the tukey based anomaly prediction, first the historical data is grouped by time stamps and parameters associated with each group are identified. Next, the prediction interval for the testing dataset is acquired and divided into four quarters. Finally, the predicting anomaly 456 predicts an anomaly. For example the block diagram 450 groups the data by time stamp, and computes the mean on each of them. Next, a prediction interval $I_\alpha(x)$ is acquired, at time stamp i, and the prediction interval into four quarters. The predicting anomaly 456 predicts an high likelihood of an anomaly when mean$_k<Q_1-3|Q_3-Q_1|$ or mean$_k>Q_3+3|Q_3-Q_1|$.

In certain embodiments, after traffic forecasting based on anomaly detection or anomaly prediction is performed, the RCA framework 400 filters the results before reporting the results to a system administrator. Filtering reduces the possibility of false positives. For example, the post-processing filter could be a throughput threshold such that If the sample value (i) falls below the threshold and the anomaly detection method declares that sample to be an anomaly sample, the system gives an anomaly alarm or (ii) exceeds that threshold, the filter declares that sample to not be an anomaly (irrespective of whether or not the machine learning model declares that sample to be anomaly). Different thresholds can be applied for different days, different time of day, different seasonal throughput averages and the like.

Figure 5A:
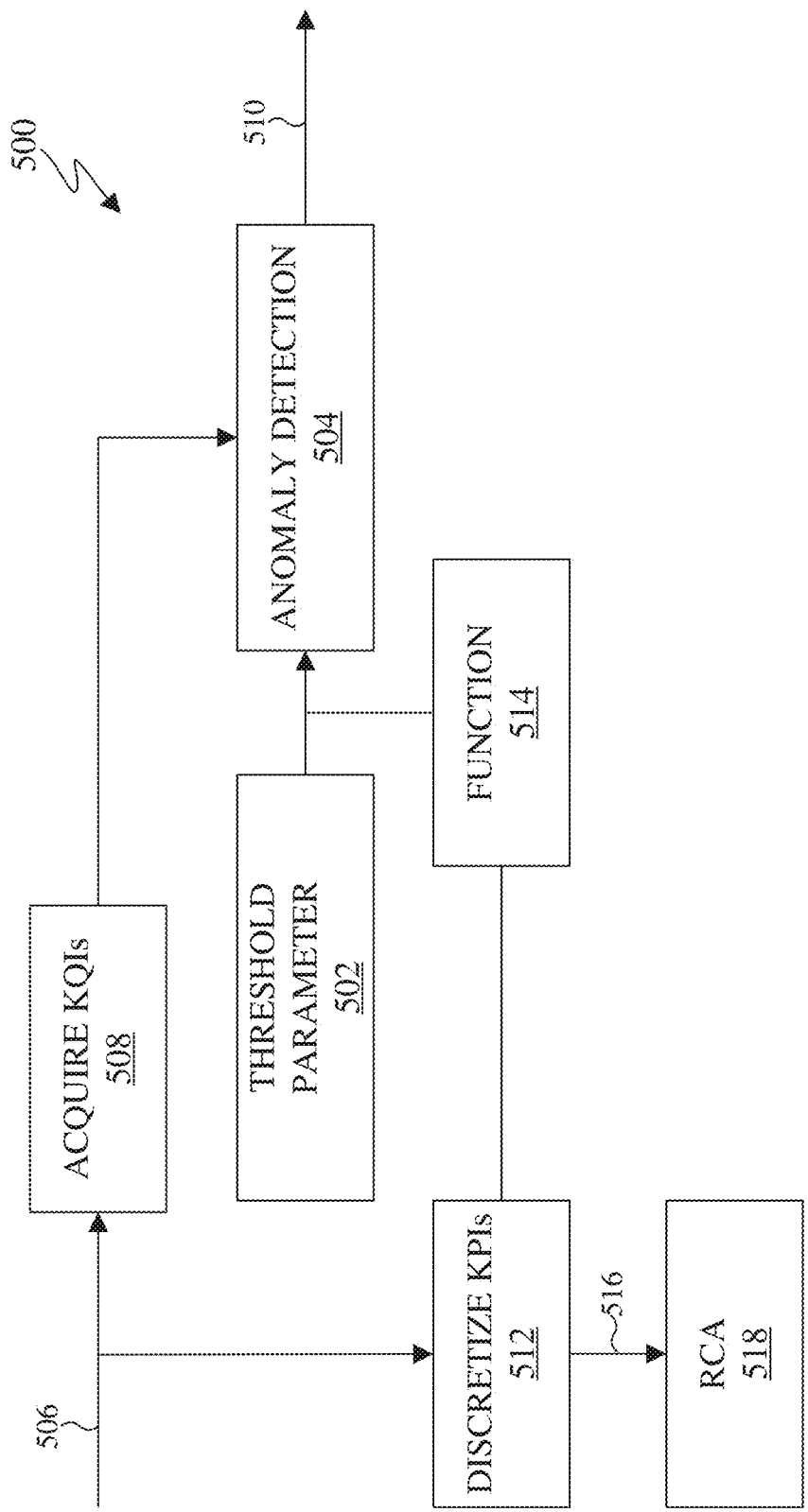
FIG. 5A illustrates a block diagram for selecting discretization parameter threshold according to various embodiments of the present disclosure.

The block diagram 500, as illustrated in FIG. 5A describes discretizing KPI data. The block diagram 500 can be performed by a server that is associated with the RCA framework 400 of FIG. 4A. The block diagram 500 describes a function or database that includes a mapping relating anomaly detection threshold to quantization thresholds for discretizing KPI data. Additionally, the block diagram 500 describes a function or database that includes a mapping that relates geographical areas, time of day, operator, and quantization thresholds for discretizing KPI data. For example, for a threshold of 1 Mbps, the discretization thresholds can be based on 90 percentile of an hourly KPI value. For another example, for a threshold of 0.1 Mbps, the discretization thresholds can be based on 99 percentile of an hourly KPI value. For yet another example, for a threshold of 0.01 Mbps, the discretization thresholds can be based on 99.9 percentile of an hourly KPI value. It is noted that similar rules can be developed based on the tie of day, the geographic location, and the like.

For example, a threshold parameter (block 502) for anomaly detection is selected. The selected threshold parameter (block 502) is received by the anomaly detection block 504. The anomaly detection block 504 is similar to the anomaly detector 412a and 412b of FIG. 4A. The anomaly detection block 504 detects an anomaly based on the selected threshold parameter. In block 508 KQIs are acquired from KPI data 506. The anomaly detection block 504 receives the acquired KQIs (of block 508) and the thresholds in order to generate a list of KQI anomaly samples 510. Block 512 discretize KPIs based on the KPI data 506 and a function 514, where the function 514 is based on the selected threshold parameter (block 502). The discretized PM data 516 is used for the RCA 518. The RCA 518 is similar to the RCA 420 of FIG. 4A.

In other embodiments, a percentile or absolute threshold for discretizing PM data is selected for the RCA in an iterative manner. For example, the thresholds for one or more PM data could be set to a starting value and the in order to evaluate the corresponding confidence score, based on Equation (7), and hit ratio, based on Equation (8). If the confidence score, the hit ratio, or both the confidence score and the hit ratio do not satisfy the design constraints, the thresholds are correspondingly adjusted iteratively until the design constraints are satisfied. In yet another embodiment, the iterative process of determining the PM thresholds for RCA are repeatedly executed every time the thresholds for detecting KQI anomalies are modified.

It is noted that for a given network, there are multiple types of geographical areas that will have different underlying patterns and statistics. For example, residential areas will see high traffic demands in the mornings and evenings, and lower demands in the middle of the day as people are at work. Conversely, industrial or commercial areas will see higher traffic demands from roughly during workday business houses, such as Monday through Friday between 9:00 AM to 6:00 PM, and very little demand outside of those times. Therefore, when setting a threshold for either anomaly detection or parameter discretization, patterns associated with geographic locations (residential areas as compared to industrial/commercial areas) and time constraints can be considered. For example, if a commercial area and a residential area are combined to compute hourly statistics and quantiles, their different usage patterns may shift the combined distribution in a way that makes outliers harder to detect.

In order to set a threshold to correspond with geographic locations and time constraints, an operator (user) can manually label the area that each eNB is in. However, manually labeling each eNB task is time consuming and needs human input every time a new site is added to the network. Alternatively, labeling each eNB can be performed automatically. For example, the root cause analysis framework 400 of FIG. 4A can identify patterns based on a statistics at the day, week, and even month level. Based on the identified patterns sites that follow similar temporal statistics can be grouped together. Identifying the patterns can be performed by a clustering or classification technique. Once a site has been classified based upon its statistical patterns, it can be grouped with sites in the same class in order to calculate long term statistics for use in anomaly detection and parameter discretization.

Based upon how quickly the statistics of a group change, a window size for computing the statistics for anomaly detection and for KPI discretization can be adjusted accordingly. For example, if a residential area typically sees the same traffic demand for 6 hours, then a KPI discretization algorithm can use a larger temporal window to calculate quantile levels. Using a large temporal window while the traffic demand is constant provides the ability to hit the precision of quantile levels that may be required by the anomaly detection. For example, in order to have a 0.999 quantile, 1000 samples are needed. If the discretization algorithm needs another level of precision, then another order of magnitude is needed in the sample count. If a local group of sites is small, then there might not be enough samples in just one hour to hit these required precisions. By adjusting the window length based upon the site region classification, the algorithm can ensure that it has enough samples to hit the level of precision needed.

The mapping between the geographical location, time f day and the KPI discretization thresholds can be stored in database. The mapping an be the used during Root Cause Analysis of the root cause analysis framework 400.

45 Table(3) below, illustrates example KPIs that can be used during RCA for uplink integrity related to KQI anomalies.

TABLE 3

| KPI | Relevant PM | Range of Discretized Variable | Quantization Thresholds |
|---|---|---|---|
| Resource | CpuLoadAvg, MemLoadAvg, DiskLoadAvg | {0, 1} 0: Normal, 1: Abnormal | CPU: 0 if <23%, 1 otherwise Mem and Disk: 0 if <90%, 1 otherwise |
| Cell Availability | EutranCellAvailability | {0, 1} 0: Normal, 1: Abnormal | 0 if EutranCellAvailability > 10% 1 if EutranCellAvailability <= 10% |
| Cell Accessibility | ErabAccessilityInit | {0, 1} 0: Normal, 1: Abnormal | 0 if ErabAccessilityInit > 0 1 if ErabAccessibiltyInit == 0 |
| BLER Initial TX on Downlink and Uplink | DLResidualBlerRetrans0 and ULResidualBlerRetrans0 | {0, 1} 0: Normal, 1: Abnormal | DL Retrans0: 0: if <=60%, 1: otherwise UL Retrans0: 0: if <=50%, 1 otherwise |

TABLE 3-continued

| KPI | Relevant PM | Range of Discretized Variable | Quantization Thresholds |
|---|---|---|---|
| Weighted DL CQI | WeightedDLReceivedCQI | {0, 1} 0: Normal, 1: Abnormal | 0: if >4, 1: otherwise |
| Uplink PRB Utilization | TotPrbULAvg | {0, 1} 0: Normal, 1: Abnormal | 0: if >0.01%, 1: otherwise |
| Uplink SINR Ratio | $ULSinrRatio = \dfrac{\sum_{i=0}^{5} SINRDistULWbPreCompBin_i}{\sum_{k=0}^{19} SINRDistULWbPreCompBin_k}$ | {0, 1, 2, 3, 4} | Denote $X_\%$ as the hourly quantile for X. 0, $X < X_{80\%}$ 1, $X_{10\%} <= X < X_{80\%}$ 2, $X_{80\%} <= X < X_{99.9\%}$ 3, $X > X_{99.9\%}$ 4, if no measurement is available |
| Uplink Scheduler MCS Ratio | $ULSchedulerMcsRatio = \dfrac{\sum_{i=0}^{5} ULSchedulerMcs_i}{\sum_{k=0}^{28} ULSchedulerMcs_k}$ | {0, 1, 2, 3, 4} | |
| Uplink Power Headroom Ratio | $ULPhrIndexRatio = \dfrac{\sum_{i=0}^{18} PhrIndex_i}{\sum_{k=0}^{63} PhrIndex_k}$ | {0, 1, 2, 3, 4} | |
| Uplink RSSI Average Interference Power | RssiPath0Avg, RssiPath1Avg InterferencePowerAvg | {0, 1, 2, 3} {0, 1, 2, 3} | |
| Interf over Thermal (UL) | $ULIoTAvg = \dfrac{1}{25}\sum_{rb=0}^{24} 10^{0.1*PRB_{rb}}$ | {0, 1, 2, 3} | |
| Uplink IP Volume | ULIpThruVol | {0, 1, 2, 3} | |
| Uplink Average UE Number | UEActiveULAvg | {0, 1, 2, 3} | |

Table (4) below, illustrates example KPIs that can be used during RCA for downlink integrity related to KQI anomalies.

TABLE 4

| KPI | Relevant PM | Range of discretized variable | Thresholds |
|---|---|---|---|
| Resource | CpuLoadAvg, MemLoadAvg, DiskLoadAvg | {0, 1} 0: Normal, 1: Abnormal | CPU: 0 if <23%, 1 otherwise Mem and Disk: 0 if <90%, 1 otherwise |
| Cell Availability | Availability | {0, 1} 0: Normal, 1: Abnormal | 0 if EutranCellAvailability > 10% 1 if EutranCellAvailability <= 10% |
| Cell Accessibility | Accessibility | {0, 1} 0: Normal, 1: Abnormal | 0 if ErabAccessibilityInit > 0 1 if ErabAccessibilityInit == 0 |
| BLER First Retx | DLResidualBlerRetrans1 | {0, 1} 0: Normal, 1: Abnormal | 0: if <60%, 1: otherwise |
| BLER HARQ Failure (DL) | DLResidualBlerRetransAvg | {0, 1} 0: Normal, 1: Abnormal | 0: if <100%, 1: otherwise |
| Null IP Traffic Volume | AirMacDLByte | {0, 1} 0: Normal, 1: Abnormal | 0 if >10 Kbytes, 1: otherwise |
| Weighted DL CQI | WeightedDLReceivedCQI | {0, 1} 0: Normal, 1: Abnormal | 0: if >4, 1: otherwise |

TABLE 4-continued

| KPI | Relevant PM | Range of discretized variable | Thresholds |
|---|---|---|---|
| Downlink PRB Utilization | TotPrbDLAvg | {0, 1, 2, 3} | Denote $X_{\%}$ as the hourly quantile for X. 0, $X < X_{80\%}$ |
| Downlink Avg. UE number | UEActiveDLAvg | {0, 1, 2, 3} | 1, $X_{10\%} <= X < X_{80\%}$ 2, $X_{80\%} <= X < X_{99.9\%}$ |
| Downlink Scheduler MCS Ratio | $DLSchedulerMcsRatio = \dfrac{\sum_{i=0}^{5} DLSchedulerMcs_i}{\sum_{k=0}^{28} DLSchedulerMcs_k}$ | {0, 1, 2, 3, 4} | 3, $X > X_{99.9\%}$ 4, if no measurement is available |

Preprocessing the PM data also includes deriving synthetic PM data. Synthetic PM data is derived by combining different KPIs. Combining different KPIs provides specific insights that are not already available within the raw PM data. The following examples describe various synthetic PMs that are useful for ascertaining the root causes for IP throughput related anomalies.

A first example synthetic PM is referred to as high resource utilization. In high resource utilization the CPU load, memory load and disk utilization for each shelf and slot of the processing units at the eNB can provide insights into the overall health of the network. For example, high CPU load could limit the ability of the eNB to serve users with their downlink and uplink traffic leading to degradation in the perceived service quality due to a decreased IP throughput and increased IP latency at the end user.

A second example synthetic PM is referred to as uplink power headroom ratio. Uplink power headroom ratio designates a ratio of the counts of power headroom reports, during the latest RI, when the eNB received power headroom report (PHR) with indexes at or below 18 to the total number of received PHR across the entire reporting range (between 0 and 63). The PHR is a quantized metric measuring the available power headroom (PH, measured in dB), defined as the difference between the UE's maximum transmit power $P_{c,max}$ and its instantaneous transmission power (determined by its estimated downlink path loss PL, its nominal PUSCH transmit power $P_{0,PUSCH}$, fractional path loss parameter $\alpha$, and number of assigned resource block $M_{PUSCH,RB}$). Equation (9), describes the power headroom.

$$PH = P_{c,max} - [P_{0,PUSCH} + \alpha \cdot PL + 10^* \log_{10} M_{PUSCH,RB}]. \quad \text{Equation (9)}$$

In Equation (9) above, PHR index j indicates that the power headroom for the UE is lies in the interval j−23 dB≤PH<j−22 dB. For example, index 0 indicates that the power headroom is between −23 dB and −22 dB while index 63 indicates that the PH exceeds 40 dB.

Equation (10) describes the uplink power headroom ratio. As described in Equation (10), ratio values close to 1 indicates that significant number of UEs are power limited (i.e. employing maximum transmission power for PUSCH transmission), suggestive of an uplink coverage problem for the cell of interest.

$$ULPhrIndexRatio = \dfrac{\sum_{i=0}^{18} PhrIndex_i}{\sum_{k=0}^{63} PhrIndex_k} \quad \text{Equation (10)}$$

A third example synthetic PM is referred to as a weighted power headroom. The weighted power headroom provides that reports from different users can be weighted in proportion to their number of occurrences. Equation (11) below describes the driving weighted power headroom.

$$WeightedPh = \dfrac{\sum_{k=0}^{63} (k-23) \times PhrIndex_k}{\sum_{k=0}^{63} PhrIndex_k} \quad \text{Equation (11)}$$

A fourth example synthetic PM is referred to as an uplink scheduler MCS ratio. The uplink scheduler MCS ratio is a ratio of the accumulated counts of resource blocks, during the latest RI, featuring uplink MCS values between 0 and 5 (inclusive) to the accumulated counts of resource blocks featuring uplink MCS values between 0 and 28 (inclusive). The corresponding KPI is named ULSchedulerMcsRatio, as shown in Equation (12) below. Ratio values that are close to one indicate that a significant number of users are served with uplink MCS values at or below 5 (corresponding to QPSK modulated symbols with low coding rate) resulting in fewer transmitted payload bits per scheduling opportunity. This is indicative of low uplink throughputs. It is noted that Equation (12) is calculated only if the denominator is greater than zero otherwise the ratio is labeled using a special value such as −1, NaN, and the like.

$$ULSchedulerMcsRatio = \dfrac{\sum_{i=0}^{5} ULSchedulerMcs_i}{\sum_{k=0}^{28} ULSchedulerMcs_k} \quad \text{Equation (12)}$$

A fifth example synthetic PM is referred to as an Uplink Low SINR Ratio. The Low SINR Ratio is a ratio of the accumulated counts, during the latest RI, of Uplink SINR values in the range [−10 dB, 2 dB] (before Outer-loop compensation) to the accumulated count of Uplink SINR values in the range [−10 dB, 30 dB] (before Outer-loop compensation). The corresponding KPI is named ULLowSinrRatio and described in Equation (13) below. Cells with ULLowSinrRatio values close to 1 are having large proportion of users experiencing uplink SINR values at or below 0 dB. It is noted that Equation (13) is calculated when the denominator is greater than zero, otherwise the ratio is labeled using a special value such as −1, NaN, and the like.

$$ULLowSinrRatio = \dfrac{\sum_{i=0}^{5} SINRDistULWbPreComp\_Bin_i}{\sum_{l=0}^{19} SINRDistULWbPreComp\_Bin_l} \quad \text{Equation (13)}$$

A sixth example synthetic PM is referred to as a weighted uplink SINR. The weighted uplink SINR is a weighted uplink SINR, during the latest RI calculated using uplink SINR measurements (either pre- or post outer loop compensation). Equation (14) below describes the Weighted Uplink SINR $$WeightedULSinr = \frac{\sum_{k=0}^{19}(-10+2k) \times SINRDistULWbPreComp\_Bin_k}{\sum_{k=0}^{19} SINRDistULWbPreComp\_Bin_k} \quad \text{Equation (14)}$$

A seventh example synthetic PM is referred to as uplink received MCS ratio. The uplink received MCS ratio is a ratio of the of the accumulated counts, during the latest RI, when PUSCH was received with MCS values lying between 0 and 5 (inclusive) to the accumulated counts when PUSCH was received featuring uplink MCS values between 0 and 28 (inclusive). The corresponding KPI is named ULReceivedMcsRatio and described in Equation (15) below. Ratio values that are close to 1 indicate that significant number of users are served with uplink MCS values at or below 5 resulting in fewer transmitted bits per scheduling opportunity. This is indicative of low uplink throughputs. It is noted that Equation (15) is calculated when the denominator is greater than zero, otherwise the ratio is labeled using a special value such as −1, NaN, and the like.

$$ULReceivedMcsRatio = \frac{\sum_{i=0}^{5} ULReceivedMcs_i}{\sum_{k=0}^{28} ULReceivedMcs_k} \quad \text{Equation (15)}$$

An eighth example synthetic PM is referred to as downlink scheduler MCS ratio. The downlink scheduler MCS ratio is a ratio of the accumulated counts of resource blocks, within the most recent RI, featuring downlink MCS values between 0 and 5 (inclusive) to the accumulated counts of resource blocks featuring downlink MCS values between 0 and 28 (inclusive). The corresponding KPI is named DLSchedulerMcsRatio and described in Equation (16) below. Ratio values that are close to 1 indicate that significant number of users are served with downlink MCS values at or below 5 resulting in fewer transmitted bits per scheduling opportunity. This is indicative of low downlink throughputs. It is noted that Equation (16) is calculated when the denominator is greater than zero, otherwise the ratio is labeled using a special value such as −1, NaN, and the like.

$$DLSchedulerMcsRatio = \frac{\sum_{i=0}^{5} DLSchedulerMcs_i}{\sum_{k=0}^{28} DLSchedulerMcs_k} \quad \text{Equation (16)}$$

A ninth example synthetic PM is referred to as weighted downlink MCS. The weighted downlink MCS is the weighted average of the MCS values, obtained by considering the number of times each MCS level has been used during the time interval leading up to the most recent RI. The corresponding KPI is named WeightedDLScheduledMcs and is described in Equation (17) below. It is noted that Equation (17) is calculated when the denominator is greater than zero, otherwise the ratio is labeled using a special value such as −1, NaN, and the like.

$$WeightedDLScheduledMcs = \frac{\sum_{k=0}^{28} DLSchedulerMcs_k}{\sum_{k=0}^{28} DLSchedulerMcs_k} \quad \text{Equation (17)}$$

A tenth example synthetic PM is referred to as weighted transmitted downlink MCS. The weighted transmitted downlink MCS, is described in Equation (18) below and includes the weighted average of the Modulation and Coding scheme used for PDSCH transmission. Small values of weighted downlink MCS are indicative of poor radio conditions leading to deteriorated downlink IP throughput. The calculation can be based on either the histogram counts of the number of occurrences for each MCS level, or based on the number of resources (time-domain, frequency-domain) assigned to each MCS level. Other embodiments can calculate this quantity averaged across the code word and spatial layer domain. It is noted that Equation (18) is calculated when the denominator is greater than zero, otherwise the ratio is labeled using a special value such as −1, NaN, and the like.

$$WeightedDLTransmittedMcs = \frac{\sum_{i=0}^{1} \sum_{j=1}^{4} \sum_{0 \leq k \leq 28} k \times DLTransmittedMcs_{ijk}}{\sum_{i=0}^{1} \sum_{j=1}^{4} \sum_{0 \leq k \leq 28} DLTransmittedMcs_{ijk}} \quad \text{Equation (18)}$$

An eleventh example synthetic PM is referred to as weighted Downlink CQI. The weighted Downlink CQI, is described in Equation (19) and is calculated by the weighted average channel quality where the weighting is in proportion to the histogram counts for each CQI level between 0 and 15. Small values of weighted CQI are indicative of poor radio conditions leading to deteriorated downlink IP throughput. In other embodiments, the weighting is in proportion to the number of radio resources (time-, frequency- and spatial domain) dedicated to transmission of each CQI level.

$$WeightedDLReceivedCQI = \frac{\sum_{i=0}^{1} \sum_{j=1}^{4} \sum_{k=0}^{15} k \times DLReceivedCQI_{ijk}}{\sum_{i=0}^{1} \sum_{j=1}^{4} \sum_{k=0}^{15} DLReceivedCQI_{ijk}} \quad \text{Equation (19)}$$

A twelfth example synthetic PM is referred to as downlink control channel utilization. The downlink control channel utilization is described in Equation (20) and is calculated by the weighted average of the control channel element (CCE) sizes used for transmitting downlink control channel information to the end-user. The CCE sizes vary between 1, 2, 4 and 8 with larger CCE sizes typically used for users with bad radio quality. As such, the weighted average values equal to, or exceeding 4, are indicative of poor downlink radio quality. It is noted that other embodiments could include statistics of the CCE allocation failure percentage for scheduling downlink assignments, uplink grants, and the like.

$$WeightedCceUsageDistDL = \frac{\sum_{0 \leq k \leq 3} 2^k \times RruCceUsageDistDL_k}{\sum_{0 \leq k \leq 3} RruCceUsageDistDL_k} \quad \text{Equation (20)}$$

A thirteenth example synthetic PM is referred to as control format utilization. The control format utilization is used to determine the control channel overhead (either 1, 2 or 3 OFDM symbols), where larger overheads imply reduced resource availability for data channel. In certain embodiments, the CF ratio can be calculated via the ratio of histogram counts of CF values of 3 to the total number of counts as described below in Equation (21).

$$CFIRatio = \frac{Cfi3\text{Count}}{Cfi1\text{Count} + Cfi2\text{Count} + Cfi3\text{Count}} \quad \text{Equation (21)}$$

Preprocessing the PM data can also include generating ca KPI hierarchy. During each RI, each eNB reports a large quantity of KPIs. The received KPIs provide detailed information on the health and state of the network between the previous RI and the current RI. The received KPIs can be across different protocol layers.

Figure 5B:
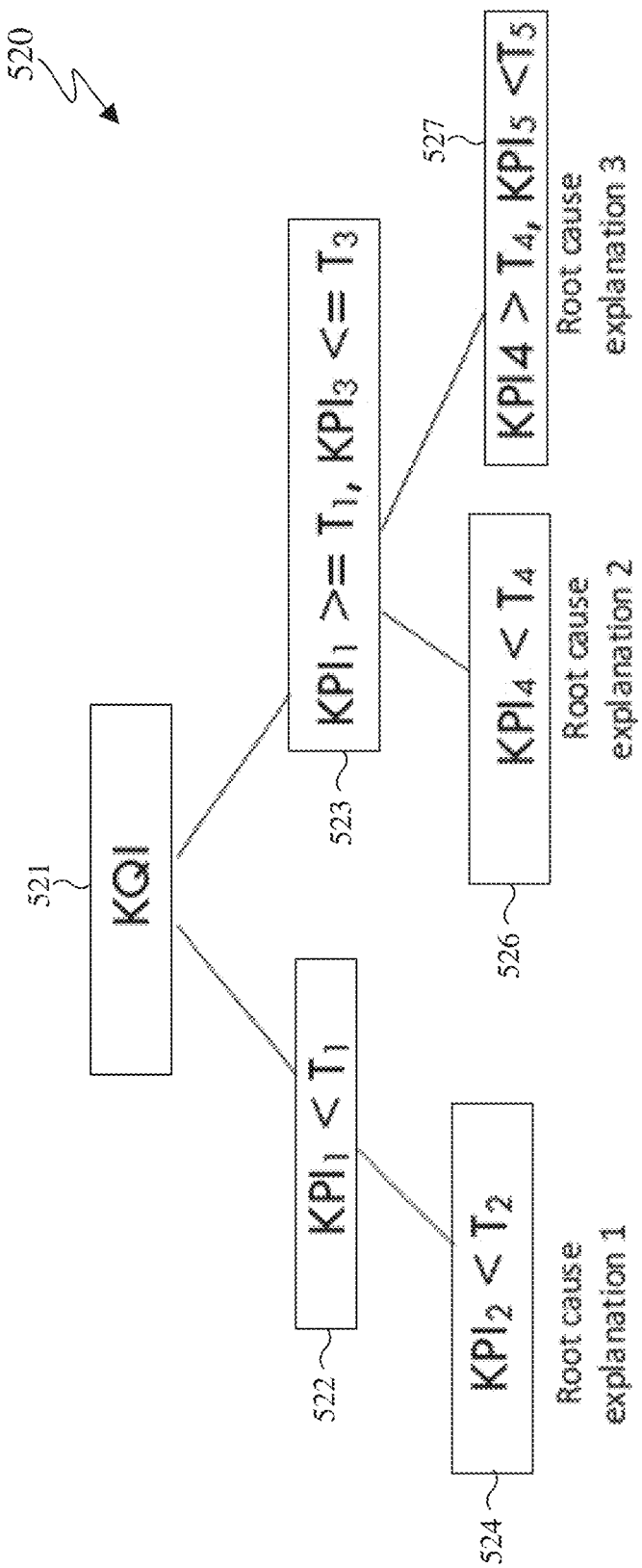
FIG. 5B illustrates an example KPI tree hierarchy according to various embodiments of the present disclosure.

A KPI tree hierarchy refers to a hierarchical relationship between KPIs. FIG. 5B illustrates an example KPI tree hierarchy 520 describing an example hierarchical relationship between different KPIs (such as $KPI_1$, $KPI_2$, $KPI_3$, $KPI_4$, and $KPI_5$). The different KPIs of FIG. 5B belonging to a certain service category. The root node 521 is the KQI of interest. The service category KQI defines the root node or Level 0 KPI. Each KPI at level i provides fine grained information regarding the state of the eNB. In certain embodiments, the tree may or may not be a binary tree. The hierarchy could be obtained either via human domain expert or via a mix of machine learning and EDA tools (such as RAPIDMINER).

The paths linking each parent node to the child node of the KPI tree hierarchy 520 are mutually exclusive. For example, node 522 is a parent node of the node 524, and the node 524 is a child node of the node 522. Each child node in the tree corresponds to a KPI or multiple KPIs satisfying a certain inequality constraint with confidence exceeding a minimum confidence threshold. In certain embodiments, the minimum confidence threshold is 85%. KPIs that lie higher in the tree (such as node 522 as compared to node 524) are associated with symptoms for the anomaly. KPIs at the bottom of the tree provide the root cause explanation for the anomaly.

In certain embodiments, KPI tree hierarchy can include more levels than the two levels illustrated in the KPI tree hierarchy 520. For example, deeper trees are able to provide more detailed explanations such as listing more symptoms and the root cause associated with the KQI anomaly.

For example, the first level of the tree corresponds to the rules at node 522 and node 523: The rule at node 522 is based on the relationship $KPI_1 < T_1 \Rightarrow AN_{KQI} = 1$ and the rule at node 524 is based on the relationship $KPI_1 \geq T_1$, $KPI_3 \leq T_3 \Rightarrow AN_{KQI} = 1$. The second level of the KPI tree hierarchy 520 provides the root cause explanation. For example, node 524 provides the root cause explanation for when $KPI_1 < T_1$, $KPI_2 < T_2 \Rightarrow AN_{KQI} = 1$. The node 526 provides the root cause explanation for when $KPI_1 < T_1$, $KPI_2 < T_2$, $KPI_4 < T_4 \Rightarrow AN_{KQI}$. The node 527 provides the root cause explanation for when $KPI_1 \geq T_1$, $KPI_3 \leq T_3$, $KPI_4 > T_4$, $KPI_5 < T_5 \Rightarrow AN_{KQI} = 1$.

Figure 5C:
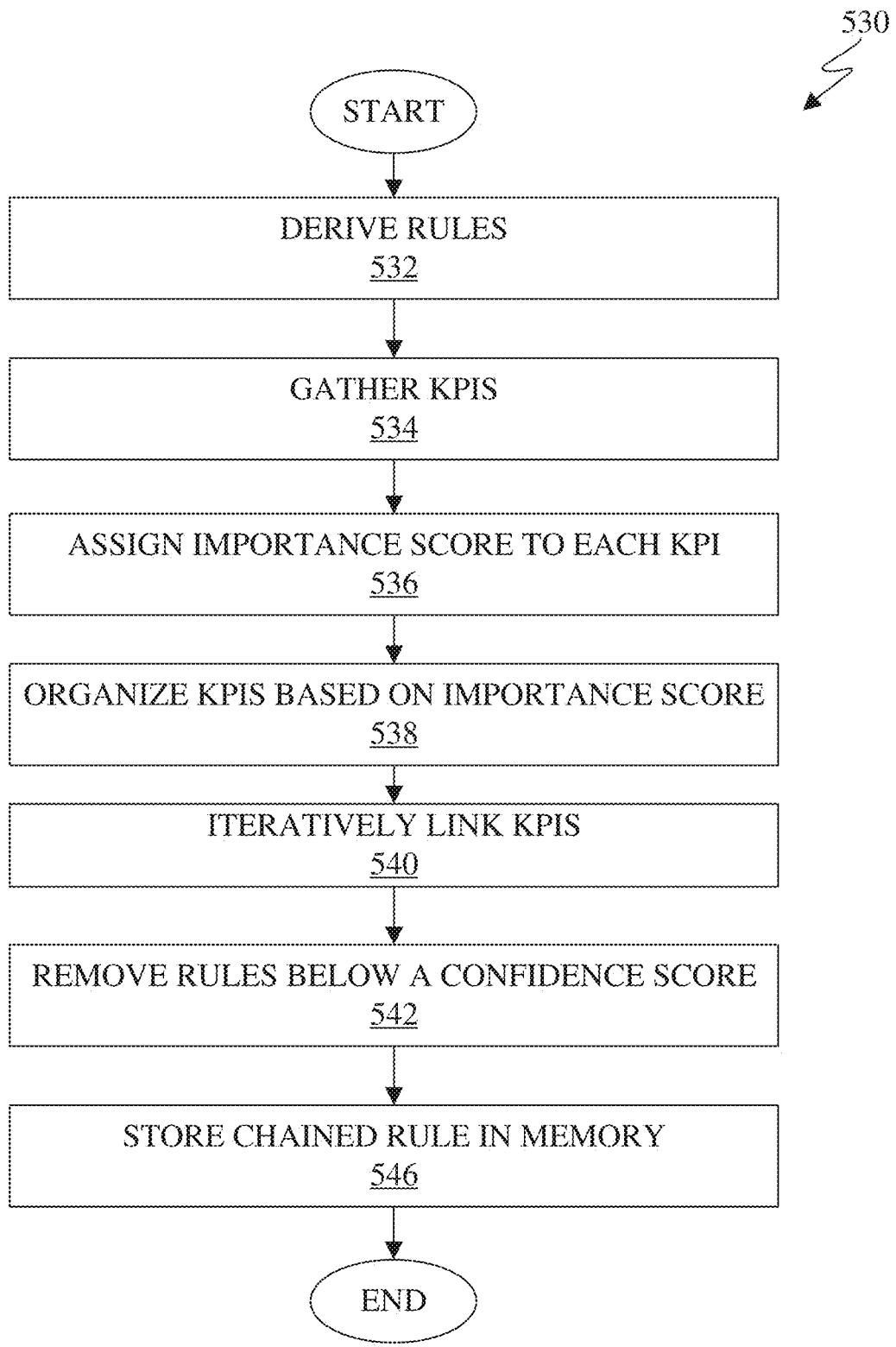
FIG. 5C illustrates a flowchart for constructing KPI tree hierarchy according to various embodiments of the present disclosure.

FIG. 5C illustrates a flowchart 530 for constructing KPI tree hierarchy according to various embodiments of the present disclosure. In certain embodiments, the RCA framework 400 of FIG. 4A generates a KPI tree hierarchy, such as the KPI tree hierarchy 520.

Once generated a KPI hierarchy tree explains the underlying root causes and the associated symptoms accompanying the anomaly. Generally, the first step consists of deriving rules consisting of singleton antecedents which is in the form $KPI_j < T_j \Rightarrow AN_{KQI} = 1$, subject to a minimum confidence. First, although a basic rule may provide high confidence, the accompanying KPI may or may not be the root cause(s) for the anomaly. For example, a rule relating low Downlink traffic volume to IP throughput anomaly may provide a high confidence but the underlying root cause—causing traffic volume to be low—is either due to poor radio conditions at users for that cell, or due to lack of cell accessibility or due to insufficient traffic demand at that cell. Ascertaining the underlying root cause requires insights into the events leading up to the root causes. One way to do so is by chaining (such as using the logical term AND) the antecedents belonging to one or more basic rules to form more complex rules. By chaining rules together the overall confidence of the chained rule is improved. The chained rule also helps generate insights into cause-and-effect relationship leading up to the IP throughput anomaly. Second, various singleton rules can perform poorly under certain specific scenarios. For example, a basic rule $KPI_1 < t_1 \Rightarrow AN_{KQI} = 1$, which provides high confidence, could however provide a low confidence that is which is conditioned on a second event $KPI_2 < t_2$. For example, if Equation (22), below, corresponds to the first confidence, and Equation (23), below, corresponds to the second confidence, by the rules of probability, based on Equation (24), below, overall confidence may be high on an average, but the confidence of the individual term e.g. Confidence($KPI_1 < t_1$, $KPI_2 \geq t_2 \Rightarrow AN_{KQI} = 1$) could be relatively low.

$$\text{Confidence}(KPI_1 < t_1 \Rightarrow AN_{KQI} = 1) = Pr[s \in AN_{KQI} | s \in \{q: KPI_1(q) < t_1\}] \quad \text{Equation (22)}$$

$$\text{Confidence}(KPI_1 < t_1, KPI_2 < t_2 \Rightarrow AN_{KQI} = 1) = Pr[s \in AN_{KQI} | s \in \{q: KPI_1(q) < t_1, KPI_2(q) < t_2\}] \quad \text{Equation (23)}$$

$$\text{Confidence}(KPI_1 < t_1 \Rightarrow AN_{KQI} = 1) = \text{Confidence}(KPI_1 < t_1, KPI_2 < t_2 \Rightarrow AN_{KQI} = 1) \times Pr[KPI_2 < t_2 | KPI_1 < t_1] + \text{Confidence}(KPI_1 < t_1, KPI_2 \geq t_2 \Rightarrow AN_{KQI} = 1) \times Pr[KPI_2 \geq t_2 | KPI_1 < t_1] \quad \text{Equation (24)}$$

To generate a KPI tree as described in the flowchart 530, $A_{KQI} \subseteq S$ is defined as the collection of reported KPIs that are associated with a KQI anomaly. That is, $AN_{KQI} = 1$ for each KQI(s) where $s \in A_{KQI}$. The objective is to derive a set of rules $\mathcal{R} = \{r_i, i=1, 2, \ldots\}$. For each rule $r \in \mathcal{R}$, let $F_{r_i} \subseteq S$ denote the set of all reported KPI data satisfying the antecedent of the rule. The KPIs could be discretized or continuous valued. In certain embodiments it is assumed that the KPIs are integer valued in the range 1 through M. It is noted that (i) the set of rules within $\mathcal{R}$ are mutually exclusive. That is, each PM sample $s \in S$ satisfies zero rules within $\mathcal{R}$ or one rule within $\mathcal{R}$, (ii) Each $R_i \in \mathcal{R}$ has confidence exceeding a predefined threshold (such as 85%), and (iii) Maximize the overall hit ratio HR is based on $$HR = \frac{1}{A_{KQI}} \sum_i |F_{r_i} \cap A_{KQI}|.$$

A set of KPIs $K = \{KPI_l, 1 \leq l \leq L\}$ are identified such that each KPI is part of a basic rule (that is, $KPI_j = T_j \Rightarrow AN_{KQI} = 1$) with confidence exceeding threshold. In one method to derive basic rules, a machine learning algorithm such as association rule mining is applied (such as the machine learning training model 414 of FIG. 4A). In certain embodiments, a human expert can determine the set of exemplary KPIs for relating KPI values or value ranges to KQI anomalies. In other embodiments, a combinations of rule mining and human expert domain knowledge can also be applied.

In one embodiment, a chained rule can be formed by concatenating every combination of KPIs i.e. $\{KPI_1=T_1, KPI_2=T_2, \ldots KPI_L=T_L \Rightarrow AN_{KQI}=1\}$ and evaluating the confidence of the chained rule. If the rule does not meet the desired confidence threshold it is discarded. In certain embodiments, if a rule does not meet the desired confidence threshold, that rule and all branches stemming from that rule are discarded, if the chaining of q KPIs—q being an algorithm or design parameter—to that rule does not satisfy the confidence threshold. Following this procedure, the first level of rules within $\mathcal{R}$ consists of singleton rules, that is, rules with single antecedent KPI. There are a maximum of $$\binom{L}{1} \times M$$

possible rules. The second level of rules consists of rules with pairs of KPIs. There are a maximum $$\binom{L}{2} \times M^2$$

possible rules consisting of KPI pairs. The third level of rules can consists of $$\binom{L}{3} \times M^3$$

combinations, and so on. The maximum number of rules within $\mathcal{R}$ is therefore $$\Sigma_{1 \leq j \leq L} \binom{L}{j} \times M^j.$$

In other embodiments, if a rule does not meet the desired confidence threshold, it is retained until a subsequent branch (obtained by chaining additional KPIs to that rule) achieves the requisite target confidence. Such embodiments could include a configurable parameter to control the number of different KPIs to chain to a rule if that rule by itself does not meet the desired confidence threshold.

An alternative embodiment includes running a rule mining algorithm on progressively smaller datasets. First, rule mining is used on a large dataset (1 or more days) in order to create basic rules, as in previous methods. Once basic rules have been discovered and ranked in a one of the ranking methods described above, the dataset is shrunk to include only samples for which the basic rule is true. Rule mining is then performed again on this smaller dataset to find 2nd order rules. This process is run on each basic rule in order of their ranking. Once 2nd order rules have been discovered, they can be ranked and the process can be run again. The process will continue until no higher order rules are discovered which match the minimum confidence requirement.

In yet another alternative embodiment, compounded rules are iteratively generated. The flowchart 530 describes this embodiment. For example, the first step, consists of ordering the KPI set K in order of importance score, ranked from highest to lowest. The importance score could be assigned starting with highest importance to the KPI whose hit ratio is maximum and lowest importance to the KPI with minimum hit ratio. In an embodiment of the invention, a human domain expert could rank the KPIs in order of their perceived qualitative importance. For example, the highest importance KPI could be set to the Availability KPI (or percentage of time that the cell was available during the time interval leading up to the most recent reporting interval), the next highest KPI could be set to the Accessibility KPI and so on.

For example, a processor evaluates the confidence of each of the M basic rules: $\{KPI_1=m \Rightarrow AN_{KQI}=1\}$, $1 \leq m \leq M$, where KPI1 is the KPI with highest importance score within K. Store the M basic rules and their confidence values within $\mathcal{R}$. For 1 lying within 2 and L and for each r lying within $\mathcal{R}$ a rule and all chained rules stemming from that rule from $\mathcal{R}$ are discarded if both of the following conditions are met. The first condition is met when the confidence of the rule lies below the minimum threshold. The second condition is met when the confidence of the chained rule obtained by chaining (all combinations of) the previous q KPIs (in order of importance) to that rule lies below the minimum threshold. Here, q is a configurable parameter lying between 1 and L−1 inclusive. For 1 lying within 2 and L and For each m lying between 1 and M inclusive the processor evaluates the confidence of chained rule by chaining the rule $KPI_l=m$ to r. When the chained rule meets the desired confidence threshold, add the chained rule and its confidence value to $\mathcal{R}$. It is noted that pruning To generate a KPI tree hierarchy, a set of rules are identified (step 532). In certain embodiments, the rules can be identified from the machine learning training model 414 of FIG. 4A. In other embodiments, the rules are created by a human expert. In certain embodiments, both the machine learning training model 414 of FIG. 1n combination with a human expert identify the rules. The rules relate KPI values or value ranges to KQI anomalies.

In step 534, a set of KPIs K=$\{KPI_l, 1 \leq l \leq L\}$ are identified (gathered) such that each KPI is part of a basic rule (that is, $KPI_l=m \Rightarrow KQI_{Anomaly}=1$) with confidence exceeding threshold.

In step 536 the set of KPIs are assigned an importance score. The importance score is based on a ranking where the highest importance is assigned to the KPI whose hit ratio is maximum and the lowest importance is assigned to the KPI with lowest hit ratio. For example, the highest importance KPI could be set to the Availability KPI (or percentage of time that the cell was available during the time interval leading up to the most recent reporting interval), and the next highest KPI could be set to the Accessibility KPI, and so on. In other embodiments, a human domain expert could rank the KPIs in order of their perceived qualitative importance. In step 538 the KPIs are organized in a list based. The order of the KPIs is in a descending order of their importance score. In certain embodiments, the list of KPIs is stored in a rule database.

In step 540, for each rule, the a KPI is iteratively linked (or chained) starting with the highest importance KPI to form a changed rule. In certain embodiments, rules with a confidence score below a threshold are removed after the KPI is iteratively chained. Rules are removed after the KPIs are iteratively changed since subsequently chaining additional KPIs to that rule, the confidence of the chained rule can potentially exceed the desired threshold.

In step 542, a rule and all chained rules are stemming from a rule are removed from the tree if (i) the confidence score of the rule is below a threshold and (ii) the confidence score of the chained rule obtained by chaining the previous KPIs to that rule are below a threshold. For example, starting from each leaf node j, a processor checks if the support, confidence, and hit ratio of the compounded rule terminating at j is identical to that obtained with a compounded rule terminating at the parent node of j. All leaf nodes for which the above is TRUE are discarded. In step 544 the chained rule is stored in a memory. In certain embodiments, a root cause explanation is generated for each chained rule.

Although FIG. 5C illustrates one example of a flowchart 530 for constructing KPI tree hierarchy, various changes may be made to FIG. 5C. For example, while shown as a series of steps, various steps in FIG. 5C could overlap, occur in parallel, or occur any number of times. For another example, similar processes can be used to create a hierarchy tree for alarm based rules.

Figure 5D:
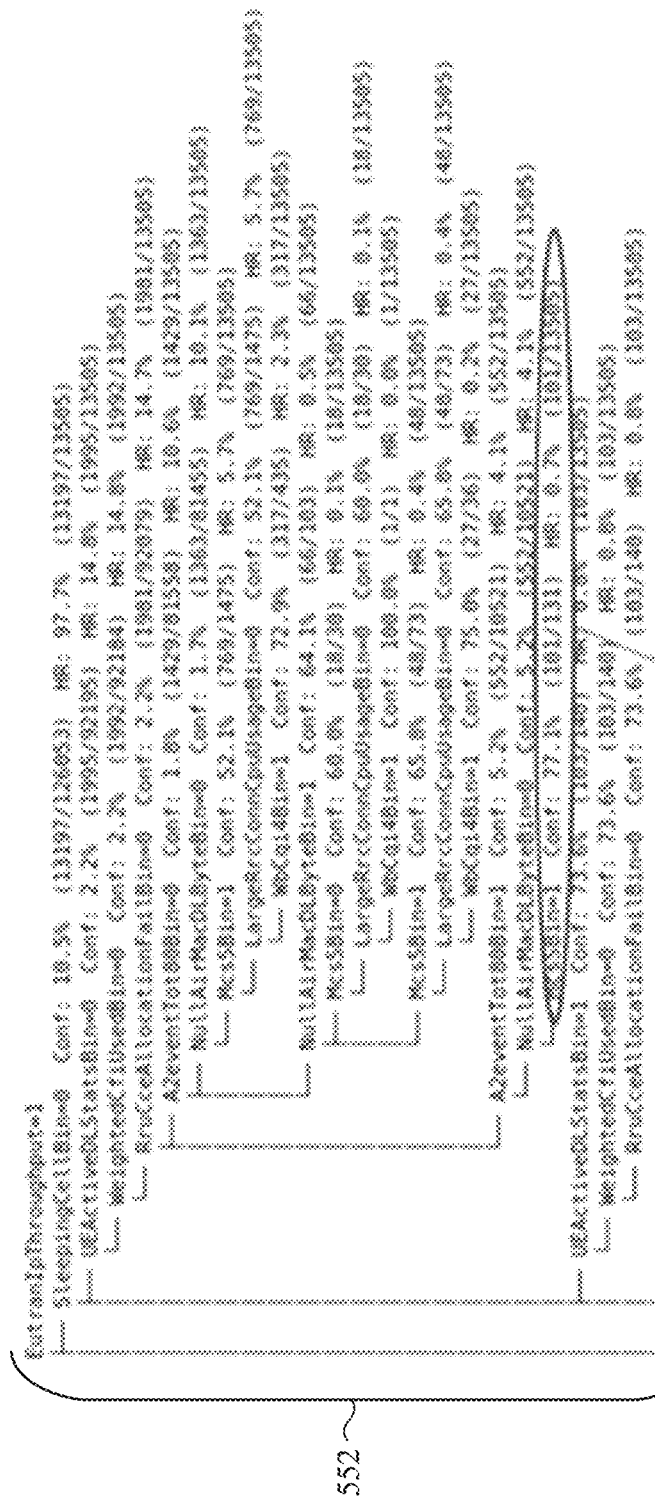
FIG. 5D illustrates an example output of a KPI tree hierarchy according to various embodiments of the present disclosure.

FIG. 5D illustrates an example output 550 of a KPI tree hierarchy according to various embodiments of the present disclosure. The example for a given tree 552, a rule, such as the rule 554 can be associated therewith.

Preprocessing can also include joint processing alarms and PM data. It is noted that alarms are event triggered based on a malfunctioning at the eNB while PM data is a per cell basis and received at certain intervals. Alarms are vital to the troubleshooting and diagnosis of hardware and software problems that potentially result in degraded network KQIs. As such, by joint processing alarms and PM data provides an explanation and the ability to predict occurrence of PM anomalies based on alarm eNB occurrences.

In certain embodiments, to extract information regarding the relationship between PM anomaly occurrences and alarm occurrences, a time domain correlator processes the time-stamped PM anomaly data and alarm data to determine time instances when they occur together or near each other.

In certain embodiments, correlations is presented in on a user interface, that depicts the distribution of the number of occurrences of alarms of different types in relation to each anomaly category. For example, the user interface consists of analysis providing temporal distribution of alarms and anomaly occurrences over a certain time duration (such as past hour, day etc.). The end-user can use this information for determining the most significant alarms that have service-level impact, and further root cause the alarm occurrences.

In certain embodiments, a causation relationships between multiple alarms. For example, if alarm A is active at time t=T, a causation relationship can indicate the probability of whether alarm B is also active at t=T. For another example, if alarm A is active at time t=T, a causation relationship can indicate the probability of whether alarm B is active at time a pre-specified time before the onset of alarm A. Similarly, if alarm A is active at time t=T, a causation relationship can indicate the probability of whether the alarm B will be active at a pre-specified time in the future (after the onset of alarm A).

The correlations between alarms can be used by the RCA framework 400 of FIG. 4A to derive information such as whether the occurrence of a low severity alarm can be used to forecast the occurrence of a high severity alarm within a certain time interval in the future.

Figure 5E:
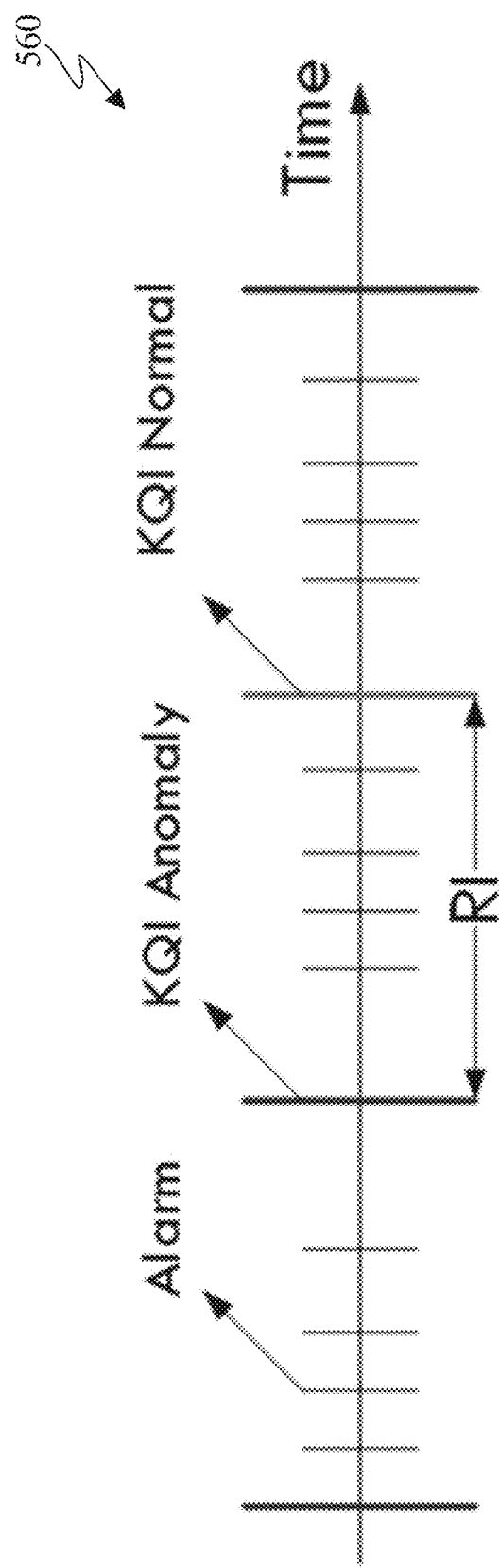
FIG. 5E illustrates a diagram for correlating key quality indicators anomalies and alarm data according to various embodiments of the present disclosure.

In certain embodiments, anomalies whose time-stamp lie outside a certain time interval can be filtered out while correlating alarm occurrences and anomaly occurrences. As such, the remaining anomalies will have at least one alarm within that time interval (such as a single a single RI), as shown in FIG. 5E. Thereafter, the number of alarm occurrences within one RI of an KQI anomaly is counted. For example, FIG. 5E illustrates the diagram 560 for correlating KQI anomalies and alarm data according to various embodiments of the present disclosure. As shown in diagram 560, the first 4 alarms have 2 anomalies within one RI, whereas the remaining 8 alarms only have 1 anomaly within 1 RI of their occurrence. When a time domain correlation between alarm and KQI anomalies is identified, then the alarm occurrence provides a root cause explanation for the KQI anomaly occurrence. In certain embodiments, a user interface can display the correlated output of the alarms and KQI anomalies across a time frame, such as a twenty-four hour period.

That is, a processor collates alarm occurrences with KQI anomalies that occur within a certain time interval of the alarm, such as one reporting interval. KQI anomalies whose time-stamps are outside the alarm interval (such as one reporting interval) are not collated with the alarm.

In certain embodiments, the RCA framework 400 of FIG. 4A can use machine learning to identify rules that include the alarm and one or more KPIs as an antecedents and the KQI anomaly as a consequence. For example, the PM data that is correlated with an alarm can result in a KQI anomaly at a later point in time. By correlating the PM data with the alarm data, enables the RCA framework 400 of FIG. 4A to preemptively detect a KQI anomaly based on alarm occurrences.

Following the collation, a machine learning algorithm (such as association rule mining, random forest) is used to identify rules. The rules can take the form of Alarm=1⇒$AD_{KQI}$=1. That is, whenever alarm occurs, with confidence greater than a threshold, indicates that there is a KQI anomaly occurrence.

Alarm data includes (i) timestamp at which the alarm was triggered and (ii) the timestamp of when the alarm is cleared. The alarm is cleared by a software routine that detects that the initial problem has self-corrected (potentially from a system reboot) or cleared by a technician working on fixing the underlying issue. Regardless of the way in which the alarm is cleared, the time at which the alarm is cleared is useful information for determining the root cause of an issue. For example, major problems will tend to have alarms that continue for a long time or alarms that comeback soon after being cleared. Therefore, embodiments of the present disclosure consider the PM reports that are within 1 RI of the start time through the clear time as correlated with the alarm. In certain embodiments, a correlation measurement can be performed between the PM metrics and the alarm of interest The PM metrics for which the correlation coefficient is high (the normalized correlation coefficient magnitude lies close to 1) are identified as correlated with the alarm.

Figure 5F:
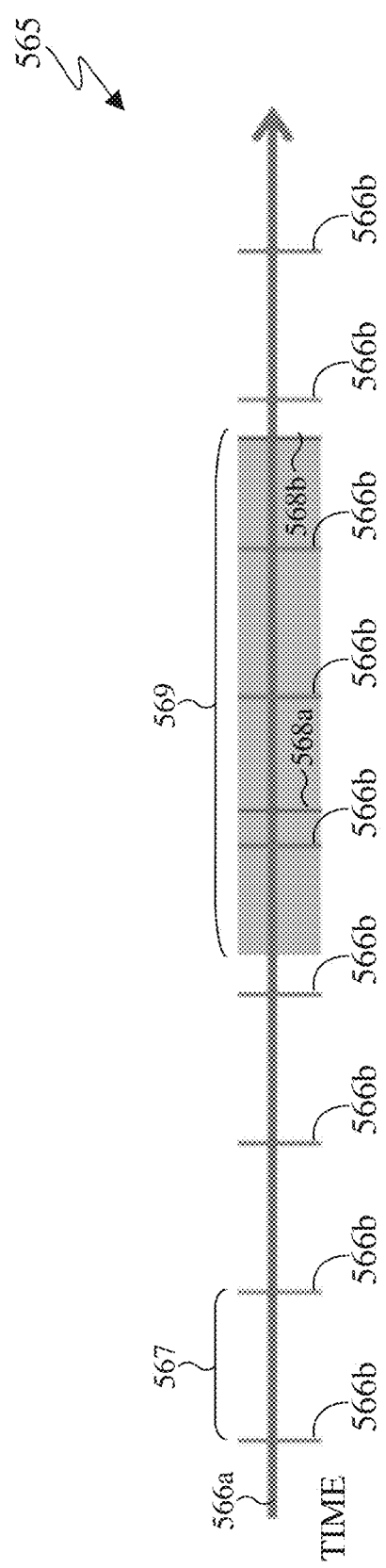
FIG. 5F illustrates a diagram for time collation of alarms and PM data according to various embodiments of the present disclosure.

FIG. 5F illustrates a diagram 565 for time collation of alarms and PM data according to various embodiments of the present disclosure. The diagram 565 describes a timeline 566a that increases in time towards the right. Each marker 566b indicates a received PM sample. The PM samples can be received regularly certain predefined time intervals 567 such as every fifteen minutes. For example, the placement of each marker 566b is separated by fifteen minutes times along the timeline 566a. Marker 568a identifies the start of the alarm and marker 566b indicates the time when the alarm is cleared. The processor correlates the PM data over the range 569. The range 569 starts a predefined time before the alarm starts (as indicated by the marker 568*a*) and ends at the end of the alarm (as indicated by the marker 568*b*). In certain embodiments, the predefined time can be 1 RI before the start of the alarm. Therefore, the processor is able to correlate the PM data before and during the alarm.

Once the collation of PM data and each alarm type is complete, it is useful to know whether the occurrence of an Alarm is a good predictor, or symptomatic with a KQI anomaly. One way to do so is to define a rule Collated Alarm=1⇒$AD_{KQI}$=1. That is, whenever the Alarm is active, the rule states that there is a KQI anomaly. The confidence of this rule, (as described in Equation (7)) refers to the fraction of Alarm samples that are also KQI anomalies. If this fraction is close to 1, the rule is reliable and hence the collated alarm is accompanied by a KQI anomaly. In certain embodiments, a machine learning algorithm (such as association rule-mining, decision trees, and the like) is applied to the set of collated (time-stamped) alarms and the corresponding KQI anomalies (takes values 0 or 1). The machine learning algorithm identifies the set of alarms whose occurrences leads to KQI anomalies with high confidence and stored it in a database or memory.

Figure 5G:
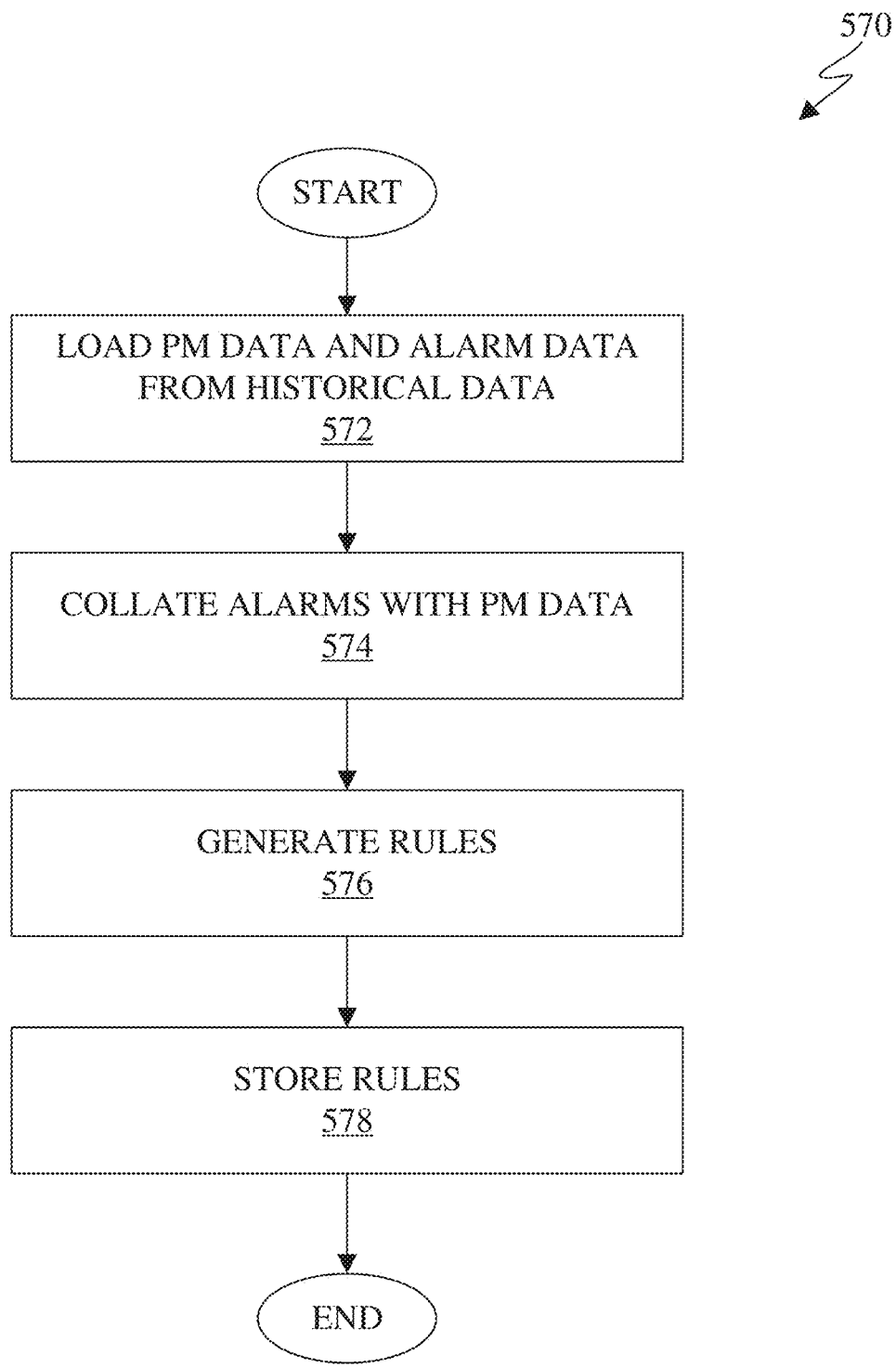
FIG. 5G illustrates a flowchart for collating and joint processing of alarms and PM data using historic data according to various embodiments of the present disclosure.

FIG. 5G illustrates the flowchart 570 for processing of both alarms and PM data using historic data according to various embodiments of the present disclosure. The flowchart 570 describes using historical data processing of alarms and PM data for generating rules based on a derived relationship between the PM data and alarms. The flowchart 570 can be performed by the RCA framework 400 of FIG. 4A.

In step 572 the RCA framework 400 loads the PM data and alarm data from the historical data 410 of FIG. 4A. In step 574 the RCA framework 400 collates (organizes) the alarm data and the PM data. For example, the RCA framework 400 identifies a start time and an end time (alarm clear time) of a single alarm. The RCA framework 400 then identifies a subset of the PM data that occurs during the alarm. Since the time of the alarm is a fixed time, the RCA framework 400 the identifies the subset of the PM data that occurs during the alarm. In certain embodiments, the RCA framework 400 identifies PM data that occurs during the alarm as well as PM data that occurs a predefined time interval before the alarm. The RCA framework 400 can identify a subset of PM data for identified alarm data.

In step 576, the RCA framework 400 generates rules based on the subsets of PM data and the corresponding alarm data. The rules include alarms or KPIs as antecedents and the KQI anomalies as consequences. The rules can be generated by the machine learning training model 414 of FIG. 4A. In step 578, the generated rules are stored in memory, such as the memory 360 of FIG. 3A or the memory 380 of FIG. 3B. In certain embodiments, only the rules that have confidence value higher than a threshold are stored in a memory.

Although FIG. 5G illustrates one example of flowchart 570 for processing of both alarms and PM data using historic data, various changes may be made to FIG. 5G. For example, while shown as a series of steps, various steps in FIG. 5G could overlap, occur in parallel, or occur any number of times.

Rule mining algorithms often struggle to create rules for low-occurrence item sets. Since anomalies are less common than normal operations and alarms are even less common than anomalies, this creates a problem when using rule mining to find relationships between alarms and anomalies. In order to boost the success of the rule miner, embodiments of the present disclosure collate alarms with anomalies rather than with all reported samples. This inflates the correlation between the rare events of alarms, making it easier for the rule mining algorithm to detect the anomalies. Additionally, the rule can be verified by testing all discovered rules against historical batched data from multiple days and locations.

Figure 5H:
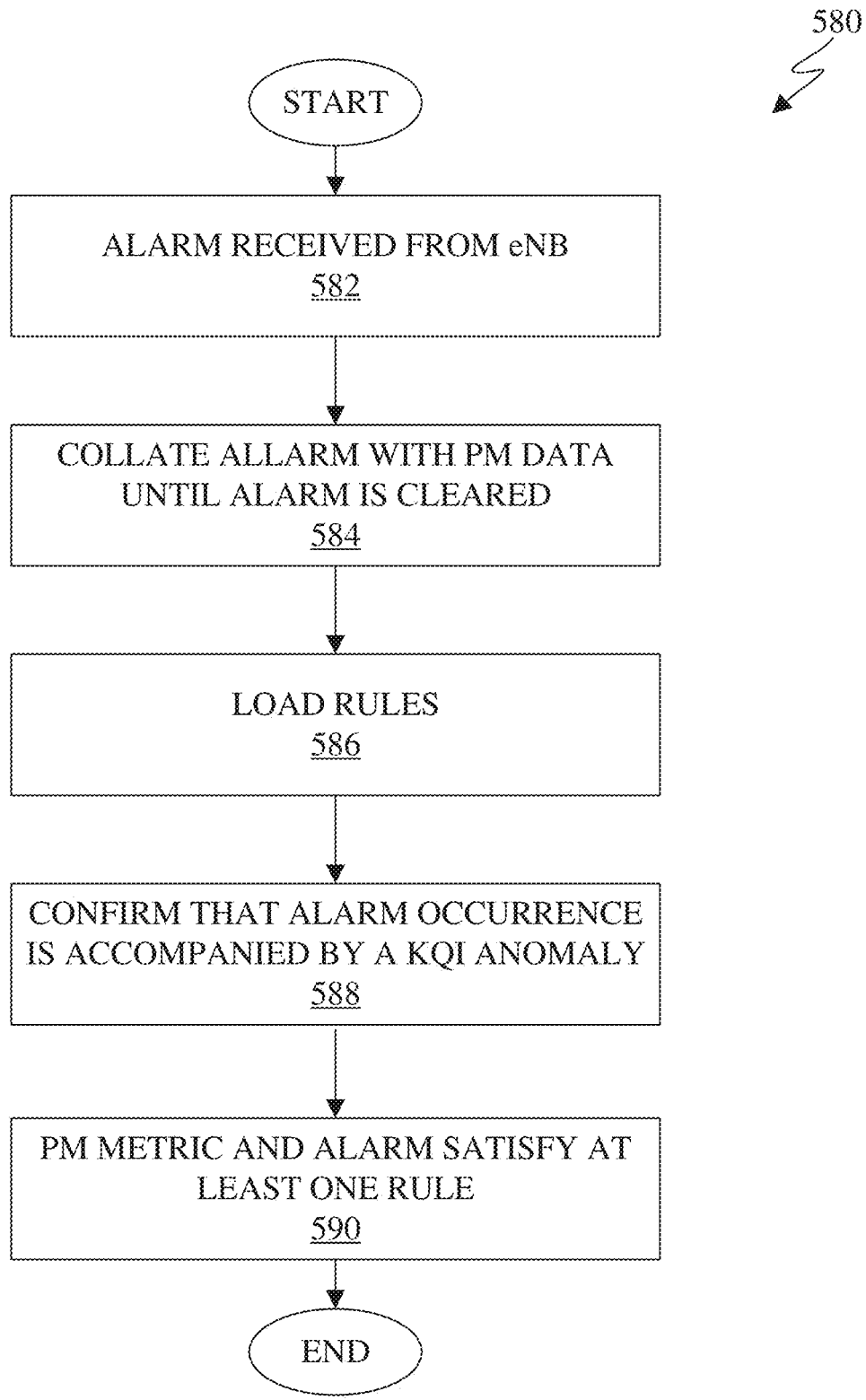
FIG. 5H illustrates a flowchart for collating and joint processing of alarms and PM data in real time according to various embodiments of the present disclosure.

In certain embodiments, correlating alarms and PM data can occur in real time as compared to historical data as described in FIG. 5H. FIG. 5H illustrates a flowchart 580 for collating and joint processing of alarms and PM data in real time according to various embodiments of the present disclosure.

To correlate alarms and PM data in real time, an alarm is first received for an eNB (step 582). In step 584, the processor marks the most recent PM data as being time collated with the alarm. The processor then maintains a memory of which eNBs currently have active alarms and which alarms are active. Until an alarm clear signal is received, the processor will mark all PM data received from the eNB (s) as collated with the alarm signal. For example, a memory can store for each alarm, the list of PM metrics that are correlated with the alarm signal, based on correlation measurement derived from historical (batch) data.

Upon receiving an alarm signal, the processor loads from memory the stored PM metrics that are been identified as correlated with the alarm and mark the data for those PM metrics as collated with the alarm signal. In step 586, the processor loads rules that contain the alarm as an antecedent and a KQI anomaly as a consequent. For example, the rules that are loaded include at least one antecedent that includes the alarm time and a consequence that is includes a KQI In step 588, the processor confirms that the alarm occurrence is accompanied by an occurrence of a KQI anomaly. After confirming that the alarm occurrence is accompanied by an occurrence of a KQI anomaly, in step 590 the processor will declare that the alarm occurrence. Then the corresponding correlated PM metrics are considered root causes for the KQI anomaly when the PM metric satisfies at least one rule containing the KQI anomaly as a consequence. In certain embodiments, the processor then displays the alarms and KPIs within the antecedent of the rule to be the root cause of the KQI anomaly.

For example, the processor will load rules that contain the alarm as an antecedent and a KQI anomaly as a consequence. If the alarm occurrence is also accompanied by a KQI anomaly, then the processor can declare that the alarm occurrence and the corresponding PM metrics are the root cause for the KQI anomaly occurrence.

Although FIG. 5H illustrates one example of flowchart 580 for collating and joint processing of alarms and PM data in real time, various changes may be made to FIG. 5H. For example, while shown as a series of steps, various steps in FIG. 5H could overlap, occur in parallel, or occur any number of times.

Figure 6:
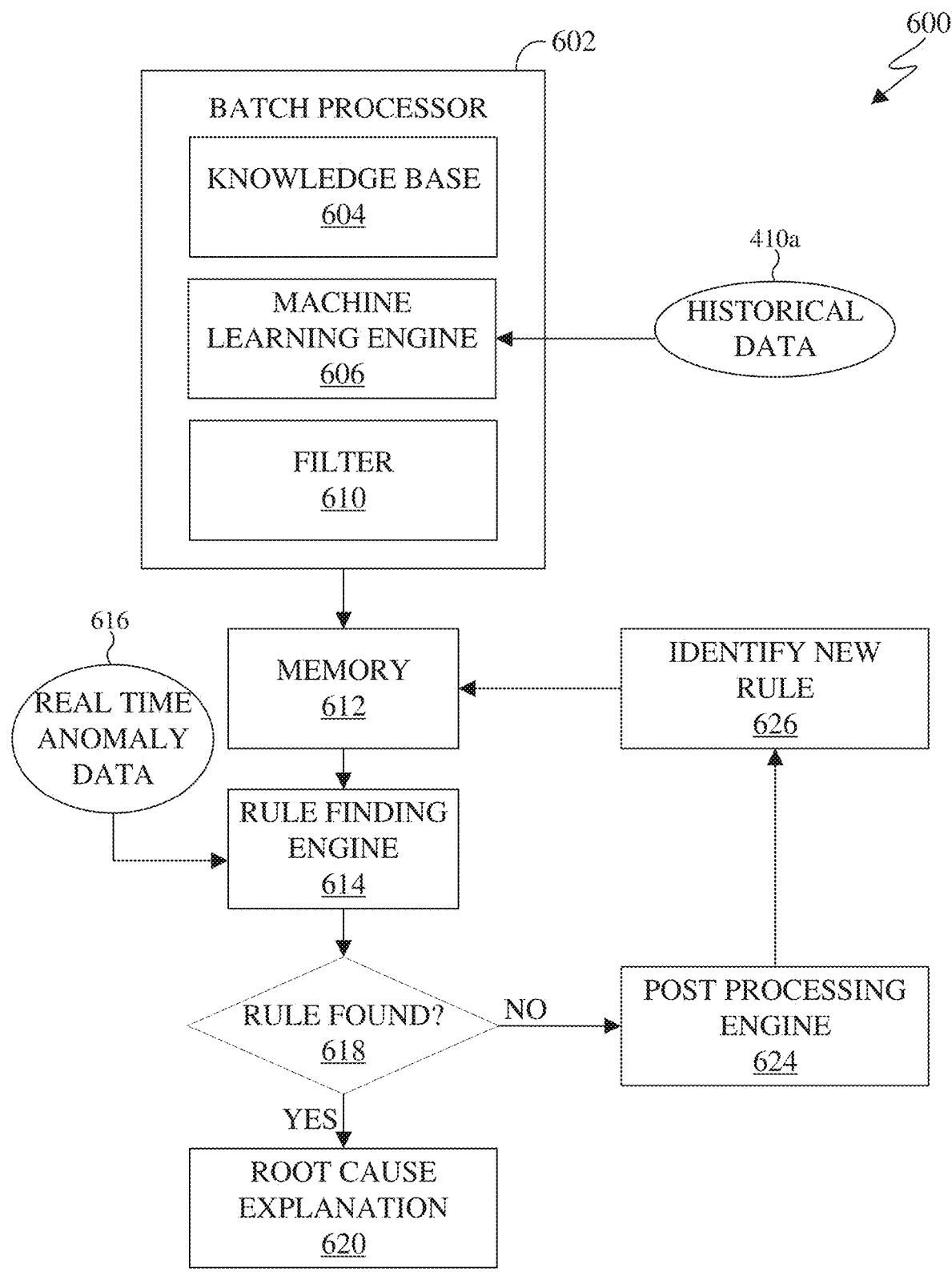
FIG. 6 illustrates a process for generating root cause explanations according to various embodiments of the present disclosure.

FIG. 6 illustrates a process 600 for generating root cause explanations according to various embodiments of the present disclosure. The process 600 can be performed by the RCA framework 400 of FIG. 4A. The embodiment of FIG. 6 is for illustration only. Other embodiments can be used without departing from the scope of the present disclosure.

The process 600 includes a batch processor 602 is similar to the batch processing layer 406 of FIG. 4A. The batch processor 602 includes a knowledge base 604, a machine learning engine 606, and a filter 610. The batch processor 602 receives historical PM data and alarm data for generating rules. The generated rules are for diagnosing root causes. The process 600 also includes a memory 612 that stores the generated rules. In certain embodiments, the memory stores the generated rules that are above a confidence threshold. The process 600 also includes a rule finding engine 614 that processes real time anomaly data 616. Upon finding a rule that are satisfied by the real time anomaly data 616, a root cause explanation 620 is outputted. When a rule is not found, the post processing engine 624 attempts to generate a new rule that is stored in the memory 612.

The knowledge base 604 maintains various categories used for diagnosing uplink and downlink throughput anomalies. The first category is for degraded uplink (coverage hole). The symptoms or effects of a degraded uplink (coverage hole) includes a large proportion of users transmitting with max power, a high usage of uplink MCS<=5 (QPSK with low coding rate), and a lack of scheduling of uplink traffic. Throughput anomalies belonging to the degraded uplink category are due to poor radio quality on the uplink as a result of coverage hole.

A second category is based on Degraded uplink (RF interference). The symptoms or effects of a degraded uplink includes (RF interference) include High Uplink RSSI & Interference power, High usage of uplink MCS<=5 (QPSK with low coding rate), and Lack of scheduling of uplink traffic. Throughput Anomalies belonging to this category are due to high levels of uplink radio frequency interference (RFI). One method for detecting these anomalies, the synthetic KPI ULLowSinrRatio takes values close to 1 for anomaly samples, since high RFI on uplink will result in increased number of uplink SINR values at or below 2 dB. In another method for detecting these anomalies, the ratio metric ULSchedulerMcsRatio takes values close to 1 for anomaly PM samples. This is due to the fact that High RFI on uplink result in a large proportion of MCS values in the range between 0 and 5 (corresponding to QPSK modulation with low coding rates).

A third category is based on Degraded downlink (RF interference). The symptoms or effects of a degraded downlink (RF interference) include reported downlink channel quality that is less than 4, high usage of uplink MCS that is less than or equal to 5 (QPSK with low coding rate), and lack of scheduling of uplink traffic. Throughput anomalies belonging to this category are due to high levels of downlink radio frequency interference (RFI). The degraded downlink can lead to missed uplink scheduling grants carried via the Physical Downlink Control Channel (PDCCH). Due to missing scheduling grants, the UE does not transmit its uplink data as instructed by its service cell. The degraded downlink can also lead to missed RLC-AM acknowledgements (generated in response for RLC packets on uplink) and potentially TCP acknowledgements. A method for detecting this anomalies, the weighted downlink channel quality, obtained from the KPI WeightedDLReceivedCQI, can be used to assess the downlink radio channel quality. Anomaly samples tend to have WeightedDLReceivedCQI taking values at or below 4, whereas normal samples have this KPI values between 0 and 15. Another method for detecting this anomalies, the ratio metric DLSchedulerMcsRatio takes values close to 1 for anomaly PM samples. The reason is because high RFI on downlink typically results in a large proportion of MCS values in the range between 0 and 5 (corresponding to QPSK modulation with low coding rates).

A fourth category is based Degraded H-ARQ Block Error Rates. The symptoms or effects of this category include Uplink H-ARQ Block Error Rate greater than 50% and Downlink H-ARQ Block Error Rate greater than 50%. Throughput Anomalies belonging to this category are due to high block error rates in the uplink and/or downlink.

A fifth category is based on low uplink traffic demand or cell not available. In this category the symptoms or effects include uplink PRB utilization close to 0, possible availability KQI anomaly, and low traffic volume and few uplink active users. Anomalies belonging to this RCA category are indicative of low demand for uplink traffic. They are accompanied by low PRB utilization, few number of uplink active users and possibly availability anomalies A sixth category is based on Low downlink traffic demand or cell not available. In this category the symptoms or effects include downlink PRB utilization close to 0, possible availability KQI anomaly, and Low traffic volume and few downlink active users. Anomalies belonging to this RCA category are indicative of low demand for uplink traffic. They are accompanied by low PRB utilization, few number of downlink active users and possibly availability anomalies The batch processor 602 processor loads historical (time-stamped) data, via the historical data 410a. The historical data 410a can be the same as the historical data 410 of FIG. 4A. The historical data 410a includes KPIs and reported alarm occurrences for each RI. The output of the batch processor 602 can be continuous valued or discrete-valued. The PM data is labeled per KQI service category, based on the outputs from anomaly detector 412a, indicating whether or not an anomaly was observed for that category (i.e. $AN_{KQI_m}=1$ for KQI category m of anomaly was detected and 0 otherwise).

The machine learning engine 606 (such as Association Rule-mining, Decision Trees, and the like) generates rules relating one or more KPIs or alarms to a KQI anomaly. A rule refers to a relationship that links the effect (KQI anomaly occurrence) with a cause. The machine learning engine 606 can apply a machine learning algorithm on the pre-processed PM data for generating a set of rules relating KPIs (or antecedents) to the KQI (consequent) in question. An example of a rule relating two KPIs A and B to a KQI C could be {A=a, B=b}⇒C=c. For RCA, the antecedent corresponds to one or more KPIs that are root causes; the consequent is a Boolean variable equaling TRUE whenever the KQI is an anomaly. In certain embodiments, the rules are generated by rule mining.

The filter 610 uses the Equations (6), (7), and (8), described above, to identify the generated rules via the machine learning engine 606 that satisfy various thresholds. For example, Equation (7) describes the confidence that fraction of anomaly samples obey a rule. The hit ratio of Equation (8) describes the fraction of KQI anomalies that are associated with a rule. Once a rules generated, outputted from the batch processor 602 and stored in the memory 612 after satisfying a design target such as a minimum support and confidence thresholds. For example, a generated rule can be compared to a confidence thresholds, and based on the comparison, the rule is saved into the memory 612

The rule finding engine 614 receives real time anomaly data 616. The real time anomaly data 616 can include input streaming KPI (one sample per eNB per RI) data and Alarm data collated with time stamps of PM anomaly samples.

The data is labeled, for each RI, according to whether or not there is a KQI anomaly and the anomaly category. For each anomaly sample, the rule finding engine 614 inspects the rules from memory 612 and identifies anomaly samples that correspond to one or more rules.

Upon finding a rule, in decision 618, a corresponding root-cause explanation 620 is provided, on a graphical user interface. Providing the root cause explanation 620 can trigger a set of remedial actions such as for example, adjust the remote electrical tilt at the eNodeB.

When the rule finding engine 614 does not find, in decision 618, the process 600 can perform post processing the PM and alarm data in order to identify a new rule. Upon identifying a new rule 626, the new rule is stored in the memory 612.

Although FIG. 6 illustrates one example of a process 600 for generating root cause explanations, various changes may be made to FIG. 5. For example, while shown as a series of steps, various steps in FIG. 6 could overlap, occur in parallel, or occur any number of times.

Figure 7:
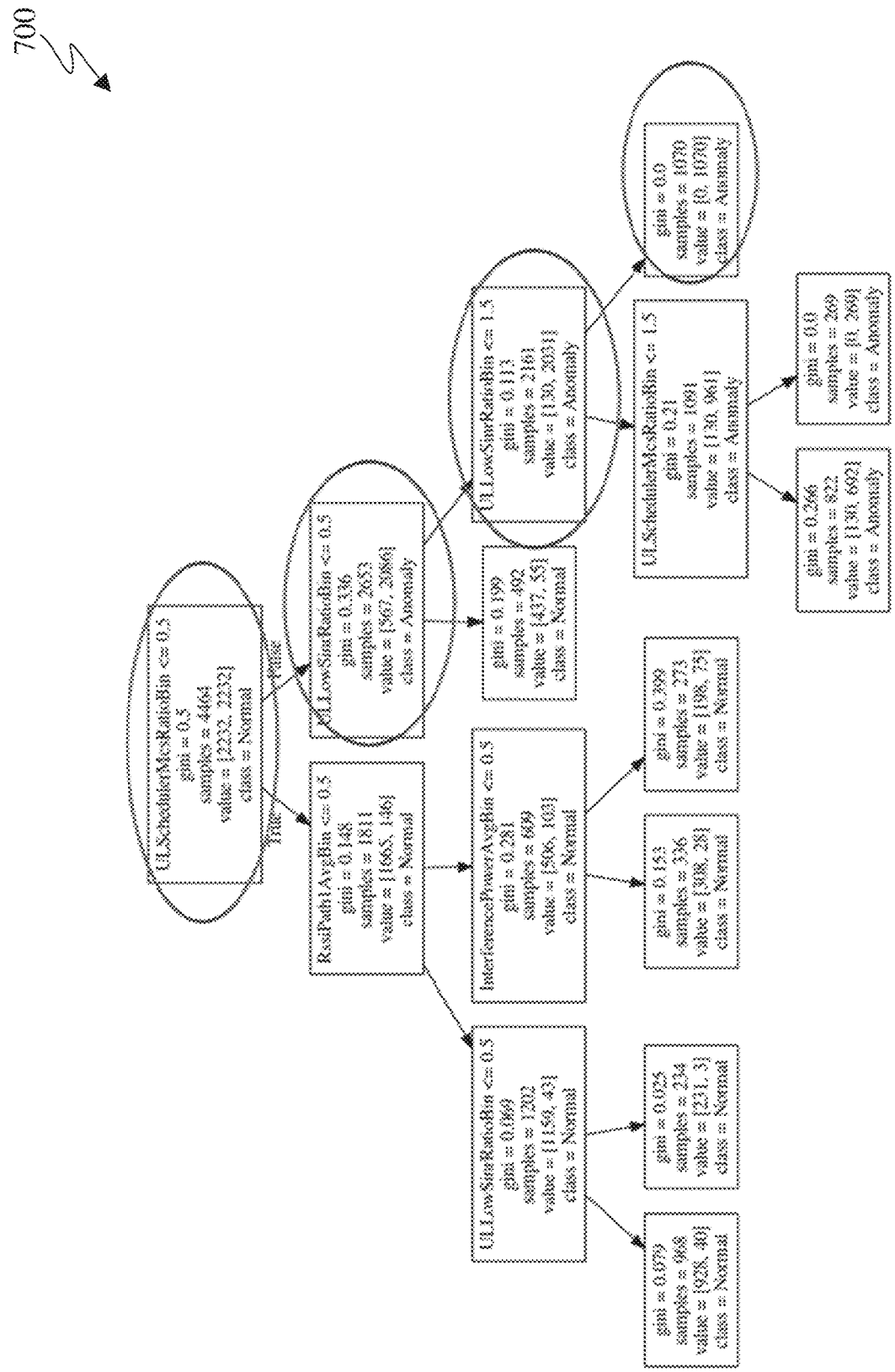
FIG. 7 illustrates an example decision tree for relating a root cause analysis for a certain KQI anomaly according to various embodiments of the present disclosure.

FIG. 7 illustrates an example decision tree 700 for relating a root cause analysis for a certain KQI anomaly according to various embodiments of the present disclosure. The embodiment of FIG. 6 is for illustration only. Other embodiments can be used without departing from the scope of the present disclosure.

The decision tree 700 is a flow-chart like tool in which each internal node "tests" an attribute on a condition. Each branch represents outcome of test, and paths from root to leaf represent rules. The decision tree 700 identifying rules relating to RCA for a certain KQI anomaly. To generate a decision tree, such as the decision tree 700, the processor identifies various parameters such as the Maximum Tree Depth, Minimum Samples for Split, and Minimum Samples for Leaf. The processor first generates N trees. Next the processor initialize Ruleset R={ }. For each tree n∈N, the processor define set P: Set of paths to leaves of KQI anomaly. For each path p∈P, the processor converts p to rule r such that R←R∪{r}. For each r∈R the processor Calculate confidence, support, and hit ratio and discards r if minimum thresholds (based on the confidence, support, and hit ratio) are not satisfied.

Figure 8:
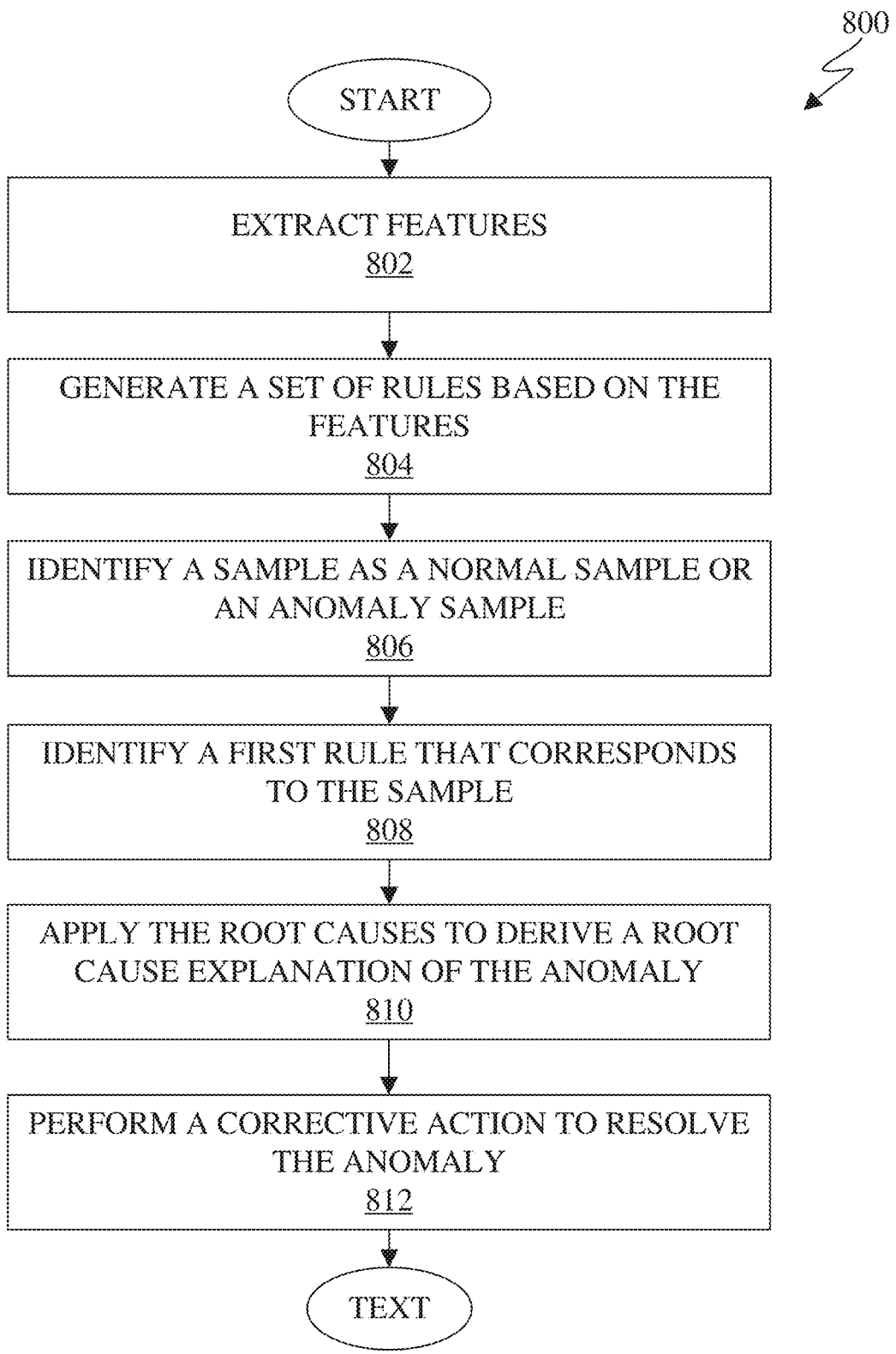
FIG. 8 illustrates an example method for discovering and diagnosing network anomalies according to various embodiments of the present disclosure.

FIG. 8 illustrates an example method 800 for discovering and diagnosing network anomalies. The method 800 can be performed by any of the eNBs of FIG. 1, the eNB 102 of FIG. 3B, any of the UE of FIG. 1, the UE 116 of FIG. 3A, or the RCA framework 400 of FIG. 4A. For ease of explanation, the method 800 is described as being performed by the an electronic device (such as the UE 116 of FIG. 3A or a server) that includes the RCA framework 400 of FIG. 4A. The embodiments of FIG. 8 are for illustration only. Other embodiments can be used without departing from the scope of this disclosure.

In step 802 the electronic device extracts features based on samples that are obtained by discretizing the KPI data and the alarm data. In step 804 the electronic device generates a set of rules based on the features. The rules can be generated on the fly or based on historical data. The rules indicate an explanation for an anomaly. That is, the rules can be applied to derive root cause explanations for anomalies in a wireless cellular network. The rule can include a of a left hand side (LHS) and right hand side (RHS). A set of KPIs and thresholds can be applied to both LHS and RHS. It is noted that the KPIs in the RHS correspond to anomaly sample if they satisfy the thresholds on the RHS, while the values of the KPIs in the LHS provide possible symptoms or root cause explanation if the KPIs in the LHS satisfy the thresholds on the LHS and if the KPIs in the RHS correspond to an anomaly sample.

In step 806 the electronic device identifies a first sample from the samples as a normal sample or an anomaly sample. The sample can be real-time KPI and alarm data. When the first sample is identified as the anomaly sample, in step 808, the electronic device identifies a first rule of the set of rules that corresponds to an anomaly of the first sample. The first rule indicates symptoms and root causes of the to the anomaly. In step 810 the electronic device applies the root causes to derive a root cause explanation of the anomaly. The root cause explanation can be based on KPIs that are linked to symptoms and root causes of the anomaly included in the sample. In step 812 the electronic device perform a corrective action to resolve the anomaly based on the first rule.

Although FIG. 8 illustrates one example of a method 800 for discovering and diagnosing network anomalies, various changes may be made to FIG. 8. For example, while shown as a series of steps, various steps in FIG. 8 could overlap, occur in parallel, or occur any number of times.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for discovering and diagnosing network anomalies, the apparatus comprising:
    a communication interface configured to receive key performance indicator (KPI) data and alarm data; and
    a processor operably connected to the communication interface, the processor is configured to:
        extract features based on samples obtained by discretizing the KPI data and the alarm data,
        generate a set of rules based on the features, wherein a portion of the samples that satisfy the rules correspond to anomalies,
        identify a sample as a normal sample or an anomaly sample,
        in response to identifying the sample as the anomaly sample, identify one or more rules that are satisfied by the sample,
        derive KPIs that are linked to symptoms and root causes for the one or more rules that are satisfied by the sample identified as the anomaly sample,
        derive a root cause explanation for an anomaly included in the sample identified as the anomaly sample based on KPIs that are linked to the symptoms and root causes of the anomaly; and
        perform a corrective action to resolve the anomaly based on the one or more rules.

2. The apparatus of claim 1, wherein the processor is further configured to:
    receive, via the communication interface, an indication of an alarm from an eNB;
    in response to receiving the indication, identify a set of the KPI data from the eNB that is received between a start of the alarm until the alarm is cleared;
    determine whether a key quality indicator (KQI) anomaly is associated with the alarm; and
    when the KQI is associated with the alarm, identify the set of the KPI data and the alarm as a root cause for the KQI anomaly.

3. The apparatus of claim 1, wherein to generate the set of rules, the processor is configured to:
identify a set of the KPI data that occurs between a predefined time before an alarm starts and the alarm is cleared; and
generate a new rule that identifies the anomaly based on the alarm data associated with the alarm and the set of the KPI data.

4. The apparatus of claim 1, wherein:
the apparatus further comprises a memory configured to store historical KPI data and historical alarm data; and
to generate the set of rules, the processor is further configured to:
generate a new rule from a set of the historical KPI data and an alarm of the historical alarm data,
derive confidence and hit ratio for the new rule wherein the confidence is based on a fraction of samples satisfying the new rule that are identified as anomaly samples and the hit ratio is based on a fraction of the anomaly samples that satisfy the new rule,
compare the confidence and the hit ratio of the new rule to a confidence threshold and a hit ratio threshold, respectively, and
store the new rule when the confidence associated with the new rule exceeds the confidence threshold and the hit ratio associated with the new rule exceeds the hit ratio threshold.

5. The apparatus of claim 1, wherein:
to discretize the KPI data the processor is configured to:
select a set of features based on the KPI data,
derive additional features based on synthetic KPI features derived from the set of features based on the KPI data, and
discretize the set of features comprising the KPI data and the synthetic KPI features; and
the processor is further configured to:
combine the discretized KPI data with the alarm data, and
generate a KPI hierarchical tree based on a portion of the set of rules, wherein the portion of the set of rules in the KPI hierarchical tree provide a root cause explanation for a first anomaly.

6. The apparatus of claim 5, wherein the processor is further configured to:
identify geographic locations that share traffic patterns as a function of time;
set a window size of a first geographic area, of the geographic locations based on a rate of change to the traffic patterns of the first geographic area; and
identify a threshold for the KPI discretization of the first geographic area based on the window size.

7. The apparatus of claim 5, wherein to generate the KPI hierarchy tree the processor is further configured to:
assign scores to the KPI data that are associated with a KQI anomaly, based on a hit ratio associated with the KPI data, respectively, wherein a first KPI that is associated with a first hit ratio is assigned a first score and a second KPI is associated with a second hit ratio is assigned a second score, the first score and the first hit ratio are higher than the second score and the second hit ratio;
iteratively link the KPI data, in descending order, based on the assigned scores to generate one or more chained rules;
identify a confidence score associated with a portion of the set of rules that correspond to the KPI data that is associated with a KQI anomaly;
discard one or more of the chained rules of the portion of the set of rules, based on whether the confidence score of a respective rule is below a threshold and whether a confidence score of a chained rule, of the one or more chained rules, is below a threshold; and
for the one or more of the chained rules discarded, identify a root cause explanation,
wherein the first KPI indicates a symptom for the first anomaly and the second KPI indicates a reason for the first anomaly.

8. The apparatus of claim 1, further comprising a display, wherein the processor is further configured to display, on the display at least one:
the one or more rules that corresponds to the anomaly,
one or more of the KPI data that is linked to the symptoms and root causes of the anomaly,
the root cause explanation for the anomaly, and
the corrective action to resolve the anomaly.

9. The apparatus of claim 1, wherein to identify the one or more rules, the processor is configured to:
identify a portion of the set of rules, with confidence scores above a threshold, that are associated with the anomaly;
separate the portion of the set of rules into a basic rule group and a non-basic rule group;
include a directed edge between rule pairs within the non-basic rule group, when a confidence scores of the rule pairs are above a threshold, wherein the directed edge indicates a relationship between the rule pair a rule within the basic rule group; and
identify a first set of the KPI data that is linked to a first rule of the one or more rules within the basic rule group as including no incoming edges as a root cause and a second set of the KPI data that is linked to any remaining rules of the one or more rules as the symptoms.

10. The apparatus of claim 1, wherein the processor is further configured to:
organize historical data input multiple groups based on time stamps;
identify parameters associated with the multiple groups; and
predict a future anomaly based on the parameters.

11. A method for discovering and diagnosing network anomalies, the method comprising:
receiving key performance indicator (KPI) data and alarm data;
extracting features based on samples obtained by discretizing the KPI data and the alarm data;
generating a set of rules based on the features, wherein a portion of the samples that satisfy the rules correspond to anomalies;
identifying a sample as a normal sample or an anomaly sample;
in response to identifying the sample as the anomaly sample, identifying one or more rules that are satisfied by the sample;
deriving KPIs that are linked to symptoms and root causes for the one or more rules that are satisfied by the sample identified as the anomaly sample;
deriving a root cause explanation for an anomaly included in the sample identified as the anomaly sample based on KPIs that are linked to the symptoms and root causes of the anomaly; and
performing a corrective action to resolve the anomaly based on the one or more rules.

12. The method of claim 11, further comprising:
receiving an indication of an alarm from an eNB;
in response to receiving the indication, identifying a set of the KPI data from the eNB that is received between a start of the alarm until the alarm is cleared;
determining whether a key quality indicator (KQI) anomaly is associated with the alarm; and
when the KQI is associated with the alarm, identifying the set of the KPI data and the alarm as a root cause for the KQI anomaly.

13. The method of claim 11, further comprising:
identifying a set of the KPI data that occurs between a predefined time before an alarm starts and the alarm is cleared; and
generating a new rule that identifies the anomaly based on the alarm data associated with the alarm and the set of the KPI data.

14. The method of claim 11, further comprising:
storing historical KPI data and historical alarm data;
generating a new rule from a set of the historical KPI data and an alarm of the historical alarm data;
deriving confidence and hit ratio for the new rule wherein the confidence is based on a fraction of samples satisfying the new rule that are identified as anomaly samples and the hit ratio is based on a fraction of the anomaly samples that satisfy the new rule;
comparing the confidence and the hit ratio of the new rule to a confidence threshold and a hit ratio threshold, respectively; and
storing the new rule when the confidence associated with the new rule exceeds the confidence threshold and the hit ratio associated with the new rule exceeds the hit ratio threshold.

15. The method of claim 11, wherein:
discretizing the KPI data comprises:
  selecting a set of features based on the KPI data,
  deriving additional features based on synthetic KPI features derived from the set of features based on the KPI data, and
  discretizing the set of features comprising the KPI data and the synthetic KPI features; and
the method further comprises:
  combining the discretized KPI data with the alarm data; and
  generating a KPI hierarchical tree based on a portion of the set of rules, wherein the portion of the set of rules in the KPI hierarchical tree provide a root cause explanation for a first anomaly.

16. The method of claim 15, further comprising:
identifying geographic locations that share traffic patterns as a function of time;
setting a window size of a first geographic area, of the geographic locations based on a rate of change to the traffic patterns of the first geographic area; and
identifying a threshold for the KPI discretization of the first geographic area based on the window size.

17. The method of claim 15, wherein generating the KPI hierarchy tree comprises:
assigning scores to the KPI data that are associated with a KQI anomaly, based on a hit ratio associated with the KPI data, respectively, wherein a first KPI that is associated with a first hit ratio is assigned a first score and a second KPI is associated with a second hit ratio is assigned a second score, the first score and the first hit ratio are higher than the second score and the second hit ratio;
iteratively linking the KPI data, in descending order, based on the assigned scores to generate one or more chained rules;
identify a confidence score associated with a portion of the set of rules that correspond to the KPI data that is associated with a KQI anomaly;
discarding one or more of the chained rules of the portion of the set of rules, based on whether the confidence score of a respective rule is below a threshold and whether a confidence score of a chained rule, of the one or more chained rules, is below a threshold; and
for the one or more of the chained rules discarded, identifying a root cause explanation,
wherein the first KPI indicates a symptom for the first anomaly and the second KPI indicates a reason for the first anomaly.

18. The method of claim 11, further comprising displaying, on a display at least one:
the one or more rules that corresponds to the anomaly,
one or more of the KPI data that is linked to the symptoms and root causes of the anomaly,
the root cause explanation for the anomaly, and
the corrective action to resolve the anomaly.

19. The method of claim 11, further comprising:
identifying a portion of the set of rules, with confidence scores above a threshold, that are associated with the anomaly;
separating the portion of the set of rules into a basic rule group and a non-basic rule group;
including a directed edge between rule pairs within the non-basic rule group, when a confidence scores of the rule pairs are above a threshold, wherein the directed edge indicates a relationship between the rule pair a rule within the basic rule group; and
identifying a first set of the KPI data that is linked to a first rule of the one or more rules within the basic rule group as including no incoming edges as a root cause and a second set of the KPI data that is linked to any remaining rules of the one or more rules as the symptoms.

20. The method of claim 11, further comprising:
organize historical data input multiple groups based on time stamps;
identify parameters associated with the multiple groups; and
predict a future anomaly based on the parameters.

* * * * *